US012008868B2

(12) United States Patent
Amaitis et al.

(10) Patent No.: US 12,008,868 B2
(45) Date of Patent: *Jun. 11, 2024

(54) CARD GAME WITH COUNTING

(71) Applicant: CFPH, LLC, New York, NY (US)

(72) Inventors: Lee Amaitis, Las Vegas, NV (US); Kevin Burman, Hunters Hill (AU); Manu Gambhir, Philadelphia, PA (US)

(73) Assignee: CFPH, LLC, New York, NY (US)

(*) Notice: Subject to any disclaimer, the term of this patent is extended or adjusted under 35 U.S.C. 154(b) by 155 days.

This patent is subject to a terminal disclaimer.

(21) Appl. No.: 17/705,451

(22) Filed: Mar. 28, 2022

(65) Prior Publication Data

US 2022/0284777 A1 Sep. 8, 2022

Related U.S. Application Data

(63) Continuation of application No. 16/192,699, filed on Nov. 15, 2018, now Pat. No. 11,288,929, which is a continuation of application No. 14/013,679, filed on Aug. 29, 2013, now Pat. No. 10,140,819, which is a continuation of application No. 13/081,787, filed on Apr. 7, 2011, now Pat. No. 8,523,183, which is a continuation of application No. 11/972,002, filed on Jan. 10, 2008, now Pat. No. 7,942,418.

(51) Int. Cl.
*G07F 17/32* (2006.01)
*A63F 1/00* (2006.01)
*A63F 3/00* (2006.01)

(52) U.S. Cl.
CPC ...... *G07F 17/3293* (2013.01); *A63F 3/00157* (2013.01); *A63F 2001/003* (2013.01)

(58) Field of Classification Search
CPC .............. G07F 17/3293; A63F 3/00157; A63F 2001/003
See application file for complete search history.

(56) References Cited

U.S. PATENT DOCUMENTS 6,241,250 B1 * 6/2001 Webb ................. A63F 3/00157 273/303
2006/0135238 A1 * 6/2006 Lancaster ........... G07F 17/3267 463/12
2008/0070659 A1 * 3/2008 Naicker .................. G07F 17/32 463/12

* cited by examiner

*Primary Examiner* — Michael D Dennis

(57) ABSTRACT

Various embodiments include determining a value of a statistic describing cards that have been dealt from a deck and modifying the rules of a game based on the statistic.

20 Claims, 2 Drawing Sheets

CARD GAME WITH COUNTING

CROSS REFERENCE TO RELATED APPLICATIONS

This application is a continuation of U.S. patent application Ser. No. 16/192,699 filed Nov. 15, 2018, which is a continuation of U.S. patent application Ser. No. 14/013,679 filed Aug. 29, 2013 (now U.S. Pat. No. 10,140,819 issued on Nov. 27, 2018), which is a continuation of U.S. patent application Ser. No. 13/081,787 filed Apr. 7, 2011 (now U.S. Pat. No. 8,523,183 issued on Sep. 3, 2013), which is a continuation of U.S. patent application Ser. No. 11/972,002 filed on Jan. 10, 2008 (now U.S. Pat. No. 7,942,418 issued on May 17, 2011), which are incorporated by reference herein in their entireties.

DETAILED DESCRIPTION

Figure 1:
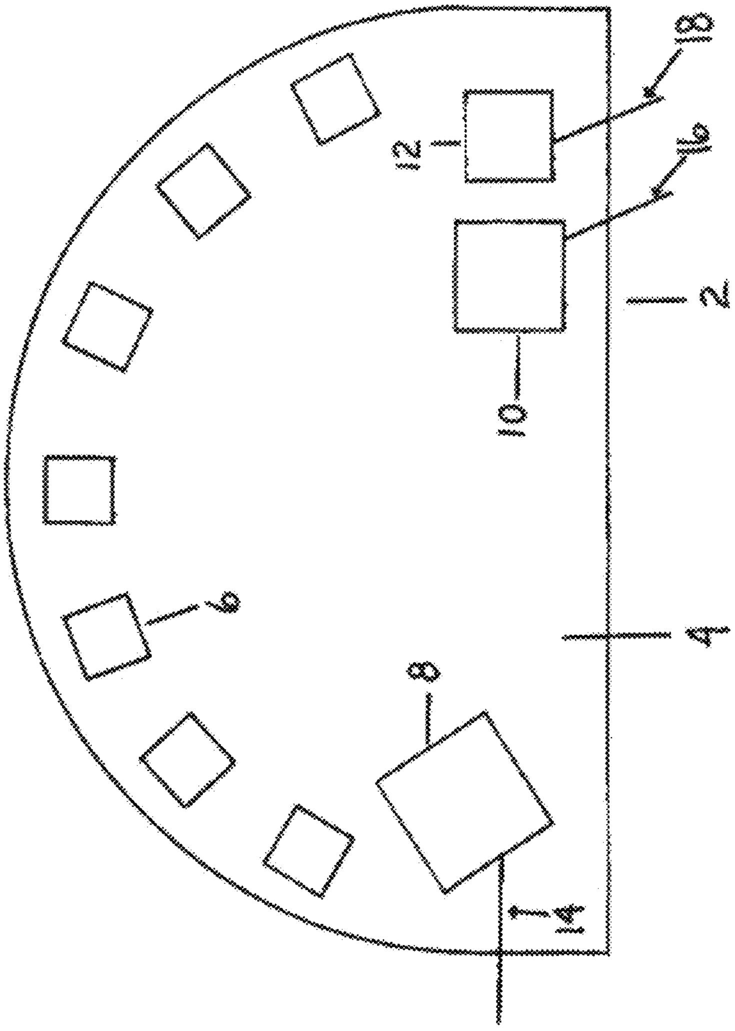
FIG. 1 shows a block diagram of components for a hand-reading system, according to some embodiments.

The following sections I-X provide a guide to interpreting the present application.

I. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of" each of the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number, and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed and does not imply that numerical methods must be used and does not imply that an algorithm or process is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples and Terminology are not Limiting

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. § 1.72(b).

The title of the present application and headings of sections provided in the present application are for convenience only and are not to be taken as limiting the disclosure in any way.

Numerous embodiments are described in the present application and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

All words in every claim have the broadest scope of meaning they would have been given by a person of ordinary skill in the art as of the priority date. No term used in any claim is specially defined or limited by this application except where expressly so stated either in this specification or in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random-access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In some embodiments, a server computer and one or more client computers may perform desired actions. Actions may be performed by one or more of the clients and/or servers in accordance with a desired distribution of labor. Such distribution of labor may be made based on where the actions may be performed more securely, more quickly, and/or more cost-effectively. For example, in some implementations, complex calculations may be performed by a central server to increase speed, display related calculations may be performed by a client because they may be simple, outcome determining calculations may be performed by a central server in order to ensure the validity of the calculations and allow tweaking of odds to be performed at a single location. It should be recognized that any desired actions may be divided among a server and any number of clients in any desired way.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. § 112, Paragraph 6

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function hat is a method, one structure for performing this method includes a computing device (e.g., a general-purpose computer) that is programmed and/or configured with appropriate hardware to perform that function.

Also includes a computing device (e.g., a general-purpose computer) that is programmed and/or configured with appropriate hardware to perform that function via other algorithms as would be understood by one of ordinary skill in the art.

VIII. Disclaimer

Numerous references to a particular embodiment does not indicate a disclaimer or disavowal of additional, different embodiments, and similarly references to the description of embodiments which all include a particular feature does not indicate a disclaimer or disavowal of embodiments which do not include that particular feature. A clear disclaimer or disavowal in the present application shall be prefaced by the phrase “does not include” or by the phrase “cannot perform”.

IX. Incorporation By Reference

Any patent, patent application or other document referred to herein is incorporated by reference into this patent application as part of the present disclosure, but only for purposes of written description in accordance with 35 U.S.C. § 112, paragraph 1 and enablement in accordance with 35 U.S.C. § 112, paragraph 1, and should in no way be used to limit, define, or otherwise construe any term of the present application where the present application, without such incorporation by reference, would not have failed to provide an ascertainable meaning, but rather would have allowed an ascertainable meaning for such term to be provided. Thus, the person of ordinary skill in the art need not have been in any way limited by any embodiments provided in the reference.

Any incorporation by reference does not, in and of itself, imply any endorsement of, ratification of, or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XI. Cards

Playing cards have been in existence for many years. Although there are many types of playing cards that are played in many different types of games, the most common type of playing cards consists of 52 cards, divided out into four different suits (namely Spades, Hearts, Diamonds and Clubs) which are printed or indicated on one side or on the face of each card. In the standard deck, each of the four suits of cards consists of 13 cards, numbered either two through ten, or lettered A (Ace), K (King), Q (Queen), or J (Jack), which is also printed or indicated on the face of each card. Each card will thus contain on its face a suit indication along with a number or letter indication. The King, Queen, and Jack usually also include some sort of design on the face of the card and may be referred to as picture cards.

In some cases, the 52-card standard playing deck also contains a number of extra cards, sometimes referred to as jokers, that may have some use or meaning depending on the particular game being played with the deck. For example, if a card game includes the jokers, then if a player receives a joker in his “hand” he may use it as any card in the deck. If the player has the ten, jack, queen and king of Spades, along with a joker, the player would use the joker as an Ace of Spades. The player will then have a Royal Flush (ten through Ace of Spades).

Many different games can be played using a standard deck of playing cards. The game being played with the standard deck of cards may include other items, such as game boards, chips, etc., or the game being played may only need the playing card deck itself. In most of the games played using a standard deck of cards, a value is assigned to each card. The value may differ for different games.

Usually, the card value begins with the number two card as the lowest value and increases as the numbers increase through ten, followed in order of increasing value with the Jack, Queen, King and Ace. In some games the Ace may have a lower value than the two, and in games where a particular card is determined to be wild, or have any value, that card may have the greatest value of all. For example, in card games where deuces, or twos, are wild, the player holding a playing card containing a two can use that two as any other card, such that a nine and a two would be the equivalent of two nines.

Further, the four different suits indicated on the cards may have a particular value depending on the game. Under game rules where one suit, i.e., Spades, has more value than another suit, i.e., Hearts, the seven of Spades may have more value than the seven of Hearts.

It is easy to visualize that using the different card quantity and suit values, many different games can be played. In certain games, it is the combination of cards that one player obtains that determines whether or not that player has defeated the other player or players. Usually, the more difficult the combination is to obtain, the more value the combination has, and the player who obtains the more difficult combination (also taking into account the value of the cards) wins the game.

For instance in the game of Poker, each player may ultimately receive five cards. The player who obtains three cards having similar numbers on their face, i.e., the four of Hearts, four of Diamonds and four of Clubs, will defeat the player having only two cards with the same numerical value, i.e., the King of Spades and the King of Hearts. However, the player with five cards that all contain Clubs, commonly known as a flush, will defeat the player with the same three of a kind described above.

In many instances, a standard deck of playing cards is used to create gaming machines. In these gaming machines players insert coins and play certain card games, such as poker, using an imitation of standard playing cards on a video screen, in an attempt to win back more money than they originally inserted into the machine.

Another form of gambling using playing cards utilizes tables, otherwise known as table games. A table uses a table and a dealer, with the players sitting or standing around the table. The players place their bets on the table and the dealer deals the cards to each player. The number of cards dealt, or whether the cards are dealt face up or face down, will depend on the particular table game being played.

Further, an imitation or depiction of a standard playing card is used in many handheld electronic games, such as poker and blackjack, and in many computer games and Internet games. Using a handheld electronic game or a computer terminal that may or may not be connected to the Internet, a player receives the imitation playing cards and plays a card game either against the computer or against other players. Further, many of these games can be played on the computer in combination with gambling.

Also, there are many game shows that are broadcasted on television that use a deck of playing cards in the game play, in which the cards are usually enlarged or shown on a video screen or monitor for easy viewing. In these television game shows, the participants play the card game for prizes or money, usually against each other, with an individual acting as a host overseeing the action.

Also, there are lottery tickets that players purchase and play by "scratching off" an opaque layer to see if they have won money and prizes. The opaque layer prevents the player from knowing the results of the lottery ticket prior to purchasing and scratching off the layer. In some of these lottery tickets, playing cards are used under the opaque layer and the player may need to match a number of similar cards in order to win the prizes or money.

XII. Rules of Card Games

Rules of Poker

In a basic poker game, which is played with a standard 52-card deck, each player is dealt five cards. All five cards in each player's hand are evaluated as a single hand with the presence of various combinations of the cards such as pairs, three-of-a-kind, straight, etc. Determining which combinations prevail over other combinations is done by reference to a table containing a ranking of the combinations. Rankings in most tables are based on the odds of each combination occurring in the player's hand. Regardless of the number of cards in a player's hand, the values assigned to the cards, and the odds, the method of evaluating all five cards in a player's hand remain the same.

Poker is a popular skill-based card game in which players with fully or partially concealed cards make wagers into a central pot. The pot is awarded to the player or players with the best combination of cards or to the player who makes an uncalled bet. Poker can also refer to video poker, a single-player game seen in casinos much like a slot machine, or to other games that use poker hand rankings.

Poker is played in a multitude of variations, but most follow the same basic pattern of play.

The right to deal each hand typically rotates among the players and is marked by a token called a 'dealer' button or buck. In a casino, a house dealer handles the cards for each hand, but a button (typically a white plastic disk) is rotated clockwise among the players to indicate a nominal dealer to determine the order of betting.

For each hand, one or more players are required to make forced bets to create an initial stake for which the players will contest. The dealer shuffles the cards, he cuts, and the appropriate number of cards are dealt to the players one at a time. Cards may be dealt either face-up or face-down, depending on the variant of poker being played. After the initial deal, the first of what may be several betting rounds begins. Between rounds, the players' hands develop in some way, often by being dealt additional cards or replacing cards previously dealt. At the end of each round, all bets are gathered into the central pot.

At any time during a betting round, if a player makes a bet, opponents are required to fold, call or raise. If one player bets and no opponents choose to match the bet, the hand ends immediately, the bettor is awarded the pot, no cards are required to be shown, and the next hand begins. The ability to win a pot without showing a hand makes bluffing possible. Bluffing is a primary feature of poker, one that distinguishes it from other vying games and from other games that make use of poker hand rankings.

At the end of the last betting round, if more than one player remains, there is a showdown, in which the players reveal their previously hidden cards and evaluate their hands. The player with the best hand according to the poker variant being played wins the pot.

The most popular poker variants are as follows:

Draw Poker

Players each receive five—as in five-card draw—or more cards, all of which are hidden. They can then replace one or more of these cards a certain number of times.

Stud Poker

Players receive cards one at a time, some being displayed to other players at the table. The key difference between stud and 'draw' poker is that players are not allowed to discard or replace any cards.

Community Card Poker

Players combine individually dealt cards with a number of "community cards" dealt face up and shared by all players. Two or four individual cards may be dealt in the most popular variations, Texas hold 'em and Omaha hold 'em, respectively.

Poker Hand Rankings

Straight Flush

A straight flush is a poker hand such as Q♠ J♠ 10♠ 9 ♠ 8♠, which contains five cards in sequence, all of the same suit. Two such hands are compared by their high card in the same way as are straights. The low ace rule also applies: 5♦ 4♦ 3♦ 2♦ A♦ is a 5-high straight flush (also known as a "steel wheel"). An ace-high straight flush such as A♣ K♣ Q♣ J♣ 10♣ is known as a royal flush and is the highest-ranking standard poker hand (excluding five of a kind).

Examples

7♥ 6♥ 5♥ 4♥ 3♥ beats 5♠ 4♠ 3♠ 2♠ A♠

J♣ 10♣ 9♣ 8♣ 7♣ ties J♦ 10♦ 9♦ 8♦ 7♦

Four of a Kind

Four of a kind, or quads, is a poker hand such as 9♣ 9 ♠ 9♦ 9♥J♥, which contains four cards of one rank, and an unmatched card. It ranks above a full house and below a straight flush. Higher ranking quads defeat lower ranking ones. Between two equal sets of four of a kind (possible in wild card and community card games), the kicker determines the winner.

Examples

10♣ 10♦ 10♥ 10♠ 5♦ ("four tens" or "quad tens") defeats 6♦ 6♥ 6♠ 6♣ K♠ ("four sixes" or "quad sixes")

10♣ 10♦ 10♥ 10♠ Q♣ ("four tens, queen kicker") defeats 10♣ 10♦ 10♥ 10♠ 5♦ ("four tens with a five")

Full House

A full house, also known as a boat or a full boat, is a poker hand such as 3♣ 3♠ 3♦ 6♣ 6♥, which contains three matching cards of one rank, plus two matching cards of another rank. It ranks below a four of a kind and above a flush. Between two full houses, the one with the higher-ranking set of three wins. If two have the same set of three (possible in wild card and community card games), the hand with the higher pair wins. Full houses are described by the three of a kind (e.g. Q-Q-Q) and pair (e.g. 9-9), as in "Queens over nines" (also used to describe a two pair), "Queens full of nines" or simply "Queens full".

Examples

10♠ 10♥ 10♦ 4♠ 4♦ ("tens full") defeats 9♥ 9♣ 9 ♠ A♥ A♣ ("nines full")

K♠ K♣ K♥ 3♦ 3♠ ("kings full") defeats 3♠ 3♥ 3♦ K ♠ K♦ ("threes full")

Q♥ Q♦ Q♣ 8♥ 8♣ ("queens full of eights") defeats Q♥ Q♦ Q♣ 5♠ 5♥ ("queens full of fives")

Flush

A flush is a poker hand such as Q♣ 10♣ 7♣ 6♣ 4♣, which contains five cards of the same suit, not in rank sequence. It ranks above a straight and below a full house. Two flushes are compared as if they were high card hands. In other words, the highest-ranking card of each is compared to determine the winner; if both have the same high card, then the second-highest ranking card is compared, etc. The suits have no value: two flushes with the same five ranks of cards are tied. Flushes are described by the highest card, as in "queen-high flush".

Examples

A♥ Q♥ 10♥ 5♥ 3♥ ("ace-high flush") defeats K♠ Q♠ J ♠ 9♠ 6♠ ("king-high flush")

A♦ K♦ 7♦ 6♦ 2♦ ("flush, ace-king high") defeats A♥ Q♥ 10♥ 5♥ 3♥ ("flush, ace-queen high")

Q♥ 10♥ 9♥ 5♥ 2♥ ("heart flush") ties Q♠ 10♠ 9♠ 5 ♠ 2♠ ("spade flush")

Straight

A straight is a poker hand such as Q♣ J♣ 10♣ 9♥ 8♥, which contains five cards of sequential rank of varying suits. It ranks above three of a kind and below a flush. Two straights are ranked by comparing the high card of each. Two straights with the same high card are of equal value and split any winnings (straights are the most commonly tied hands in poker, especially in community card games). Straights are described by the highest card, as in "queen-high straight" or "straight to the queen".

A hand such as A♣ K♣ Q♦ J♠ 10♠ is an ace-high straight and ranks above a king-high straight such as K♥ Q ♠ J♥ 10♥ 9♦. But the ace may also be played as a 1-spot in a hand such as 5♠ 4♦ 3♦ 2♥ A♥, called a wheel or five-high straight, which ranks below the six-high straight 6 ♠ 5♣ 4♣ 3♥ 2♥. The ace may not "wrap around" or play both high and low in the same hand: 3♣ 2♦ A♠ K♠ Q ♣ is not a straight, but just ace-high no pair.

Examples

8♠ 7♠ 6♥ 5♥ 4♠ ("eight-high straight") defeats 6♦ 5 ♠ 4♦ 3♥ 2♣ ("six-high straight")

8♠ 7♠ 6♥ 5♥ 4♠ ties 8♥ 7♦ 6♣ 5♣ 4♥

Three of a Kind

Three of a kind, also called trips, set or a prile, is a poker hand such as 2♦ 2♠ 2♥ K♠ 6♠, which contains three cards of the same rank, plus two unmatched cards. It ranks above two pair and below a straight. Higher ranking three of a kind defeat lower ranking three of a kinds. If two hands have the same rank three of a kind (possible in games with wild cards or community cards), the kickers are compared to break the tie.

Examples

8♠ 8♥ 8♦ 5♠ 3♣ ("three eights") defeats 5♣ 5♥ 5♦ Q♦ 10♣ ("three fives")

8♠ 8♥ 8♦ A♣ 2♦ ("three eights, ace kicker") defeats 8 ♠ 8♥ 8♦ 5♠ 3♣ ("three eights, five kicker")

Two Pair

A poker hand such as J♥ J♣ 4♣ 4♠ 9♠, which contains two cards of the same rank, plus two cards of another rank (that match each other but not the first pair), plus one unmatched card, is called two pair. It ranks above one pair and below three of a kind. Between two hands containing two pair, the higher-ranking pair of each is first compared, and the higher pair wins. If both have the same top pair, then the second pair of each is compared. Finally, if both hands have the same two pairs, the kicker determines the winner. Two pair are described by the higher pair (e.g., K♥ K♣) and the lower pair (e.g., 9♠ 9♣), as in "Kings over nines", "Kings and nines" or simply "Kings up".

Examples

K♥ K♦ 2♣ 2♦ J♥ ("kings up") defeats J♦ J♠ 10♠ 10 ♣ 9♠ ("jacks up")

9♣ 9♦ 7♦ 7♠ 6♥ ("nines and sevens") defeats 9♥ 9 ♠ 5♥ 5♦ K♠ ("nines and fives")

4♠ 4♣ 3♠ 3♥ K♦ ("fours and threes, king kicker") defeats 4♥ 4♦ 3♦ 3 10♠ ("fours and threes with a ten")

One Pair

One pair is a poker hand such as 4♥ 4♠ K♠ 10♦ 5♠, which contains two cards of the same rank, plus three unmatched cards. It ranks above any high card hand, but below all other poker hands. Higher ranking pairs defeat lower ranking pairs. If two hands have the same rank of pair, the non-paired cards in each hand (the kickers) are compared to determine the winner.

Examples

10♣ 10♠ 6♠ 4♥ 2♥ ("pair of tens") defeats 9♥ 9♣ A♥ Q♦ 10♦ ("pair of nines")

10♥ 10♦ J♦ 3♥ 2♣ ("tens with jack kicker") defeats 10♣ 10♠ 6♠ 4♥ 2♥ ("tens with six kicker")

2♦ 2♥ 8♠ 5♣ 4♣ ("deuces, eight-five-four") defeats 2♣ 2♠ 8♣ 5♥ 3♥ ("deuces, eight-five-three")

High Card

A high-card or no-pair hand is a poker hand such as K♥ J♣ 8♣ 7♦ 3♠, in which no two cards have the same rank, the five cards are not in sequence, and the five cards are not all the same suit. It can also be referred to as "nothing" or "garbage," and many other derogatory terms. It ranks below all other poker hands. Two such hands are ranked by comparing the highest-ranking card; if those are equal, then the next highest-ranking card; if those are equal, then the third highest ranking card, etc. No-pair hands are described by the one or two highest cards in the hand, such as "king high" or "ace-queen high", or by as many cards as are necessary to break a tie.

Examples

A♦ 10♦ 9♠ 5♣ 4♣ ("ace high") defeats K♣ Q♦ J♣ 8♥ 7♥ ("king high")

A♣ Q♣ 7♦ 5♥ 2♣ ("ace-queen") defeats A♦ 10♦ 9♠ 5♣ 4♣ ("ace-ten")

7♠ 6♣ 5♣ 4♦ 2♥ ("seven-six-five-four") defeats 7♣ 6♦ 5♦ 3♥ 2♣ ("seven-six-five-three")

Decks Using a Bug

The use of joker as a bug creates a slight variation of game play. When a joker is introduced in standard poker games it functions as a fifth ace or can be used as a flush or straight card (though it can be used as a wild card too). Normally casino draw poker variants use a joker, and thus the best possible hand is five of a kind, as in A♥ A♦ A♣ A♠ Joker.

Rules of Caribbean Stud

Caribbean Stud™ poker may be played as follows. A player and a dealer are each dealt five cards. If the dealer has a poker hand having a value less than Ace-King combination or better, the player automatically wins. If the dealer has a poker hand having a value of an Ace-King combination or better, then the higher of the player's or the dealer's hand wins. If the player wins, he may receive an additional bonus payment depending on the poker rank of his hand. In the commercial play of the game, a side bet is usually required to allow a chance at a progressive jackpot. In Caribbean Stud™ poker, it is the dealer's hand that must qualify. As the dealer's hand is partially concealed during play (usually only one card, at most) is displayed to the player before player wagering is complete), the player must always be aware that even ranked player hands can lose to a dealer's hand and no bonus will be paid out unless the side bet has been made, and then usually only to hands having a rank of a flush or higher.

Rules of Blackjack

Some versions of Blackjack are now described. Blackjack hands are scored according to the point total of the cards in the hand. The hand with the highest total wins as long as it is 21 or less. If the total is greater than 21, it is a called a "bust." Numbered cards 2 through 10 have a point value equal to their face value, and face cards (i.e., Jack, Queen and King) are worth 10 points. An Ace is worth 11 points unless it would bust a hand, in which case it is worth 1 point. Players play against the dealer and win by having a higher point total no greater than 21. If the player busts, the player loses, even if the dealer also busts. If the player and dealer have hands with the same point value, this is called a "push," and neither party wins the hand.

After the initial bets are placed, the dealer deals the cards, either from one or more, but typically two, hand-held decks of cards, or from a "shoe" containing multiple decks of cards, generally at least four decks of cards, and typically many more. A game in which the deck or decks of cards are hand-held is known as a "pitch" game. "Pitch" games are generally not played in casinos. When playing with more than one deck, the decks are shuffled together in order to make it more difficult to remember which cards have been dealt and which have not. The dealer deals two cards to each player and to himself. Typically, one of the dealer's two cards is dealt face-up so that all players can see it, and the other is face down. The face-down card is called the "hole card." In a European variation, the "hole card" is dealt after all the players' cards are dealt and their hands have been played. The players' cards are dealt face up from a shoe and face down if it is a "pitch" game.

A two-card hand with a point value of 21 (i.e., an Ace and a face card or a 10) is called a "Blackjack" or a "natural" and wins automatically. A player with a "natural" is conventionally paid 3:2 on his bet, although in 2003 some Las Vegas casinos began paying 6:5, typically in games with only a single deck.

Once the first two cards have been dealt to each player and the dealer, the dealer wins automatically if the dealer has a "natural" and the player does not. If the player has a "natural" and the dealer does not, the player automatically wins. If the dealer and player both have a "natural," neither party wins the hand.

If neither side has a "natural," each player completely plays out their hand; when all players have finished, the dealer plays his hand.

The playing of the hand typically involves a combination of four possible actions "hitting," "standing," "doubling down," or "splitting" his hand. Often another action called "surrendering" is added. To "hit" is to take another card. To "stand" is to take no more cards. To "double down" is to double the wager, take precisely one more card and then "stand." When a player has identical value cards, such as a pair of 8s, the player can "split" by placing an additional wager and playing each card as the first card in two new hands. To "surrender" is to forfeit half the player's bet and give up his hand. "Surrender" is not an option in most casino games of Blackjack. A player's turn ends if he "stands," "busts" or "doubles down." If the player "busts," he loses even if the dealer subsequently busts. This is the house advantage.

After all players have played their hands, the dealer then reveals the dealer's hole card and plays his hand. According to house rules (the prevalent casino rules), the dealer must hit until he has a point total of at least 17, regardless of what the players have. In most casinos, the dealer must also hit on a "soft" 17 (e.g., an Ace and 6). In a casino, the Blackjack table felt is marked to indicate if the dealer hits or stands on a soft 17. If the dealer busts, all remaining players win. Bets are normally paid out at odds of 1:1.

Four of the common rule variations are one card split Aces, early surrender, late surrender and double-down restrictions. In the first variation, one card is dealt on each Ace and the player's turn is over. In the second, the player has the option to surrender before the dealer checks for Blackjack. In the third, the player has the option to surrender after the dealer checks for Blackjack. In the fourth, doubling down is only permitted for certain card combinations.

Insurance

Insurance is a commonly offered betting option in which the player can hedge his bet by wagering that the dealer will win the hand. If the dealer's "up card" is an Ace, the player is offered the option of buying Insurance before the dealer checks his "hole card." If the player wishes to take Insurance, the player can bet an amount up to half that of his original bet. The Insurance bet is placed separately on a special portion of the table, which is usually marked with the words "Insurance Pays 2:1." The player buying Insurance is betting that the dealer's "hole card" is one with a value of 10 (i.e., a 10, Jack, Queen or King). Because the dealer's up card is an Ace, the player who buys Insurance is betting that the dealer has a "natural."

If the player originally bets $10 and the dealer shows an Ace, the player can buy Insurance by betting up to $5. Suppose the player makes a $5 Insurance bet and the player's hand with the two cards dealt to him totals 19. If the dealer's hole card is revealed to be a 10 after the Insurance betting period is over (the dealer checks for a "natural" before the players play their hands), the player loses his original $10 bet, but he wins the $5 Insurance bet at odds of 2:1, winning $10 and therefore breaking even. In the same situation, if the dealer's hole card is not one with a value of ten, the player immediately loses his $5 Insurance bet. But if the player chooses to stand on 19, and if the dealer's hand has a total value less than 19, at the end of the dealer's turn, the player wins his original $10 bet, making a net profit of $5. In the same situation, if the dealer's hole card is not one with a value of ten, again the player will immediately lose their $5 Insurance bet, and if the dealer's hand has a total value greater than the player's at the end of both of their turns, for example the player stood on 19 and the dealer ended his turn with 20, the player loses both his original $10 bet and his $5 Insurance bet.

Basic Strategy

Blackjack players can increase their expected winnings by several means, one of which is "basic strategy." "Basic strategy" is simply something that exists as a matter of general practice; it has no official sanction. The "basic strategy" determines when to hit and when to stand, as well as when doubling down or splitting in the best course. Basic strategy is based on the player's point total and the dealer's visible card. Under some conditions (e.g., playing with a single deck according to downtown Las Vegas rules) the house advantage over a player using basic strategy can be as low as 0.16%. Casinos offering options like surrender and double-after-split may be giving the player using basic strategy a statistical advantage and instead rely on players making mistakes to provide a house advantage.

A number of optional rules can benefit a skilled player, for example: if doubling down is permitted on any two-card hand other than a natural; if "doubling down" is permitted after splitting; if early surrender (forfeiting half the bet against a face or Ace up card before the dealer checks for Blackjack) is permitted; if late surrender is permitted; if re-splitting Aces is permitted (splitting when the player has more than two cards in their hand, and has just been dealt a second ace in their hand); if drawing more than one card against a split Ace is permitted; if five or more cards with a total no more than 21 is an automatic win (referred to as "Charlies").

Other optional rules can be detrimental to a skilled player. For example: if a "natural" pays less than 3:2 (e.g., Las Vegas Strip single-deck Blackjack paying out at 6:5 for a "natural"); if a hand can only be split once (is re-splitting possible for other than aces); if doubling down is restricted to certain totals (e.g., 9 11 or 10 11); if Aces may not be re-split; if the rules are those of "no-peek" (or European) Blackjack, according to which the player loses hands that have been split or "doubled down" to a dealer who has a "natural' (because the dealer does not check for this automatically winning hand until the players had played their hands); if the player loses ties with the dealer, instead of pushing where neither the player or the dealer wins and the player retains their original bet.

Card Counting

Unlike some other casino games, in which one play has no influence on any subsequent play, a hand of Blackjack removes those cards from the deck. As cards are removed from the deck, the probability of each of the remaining cards being dealt is altered (and dealing the same cards becomes impossible). If the remaining cards have an elevated proportion of 10-value cards and Aces, the player is more likely to be dealt a natural, which is to the player's advantage (because the dealer wins even money when the dealer has a natural, while the player wins at odds of 3:2 when the player has a natural). If the remaining cards have an elevated proportion of low-value cards, such as 4s, 5s and 6s, the player is more likely to bust, which is to the dealer's advantage (because if the player busts, the dealer wins even if the dealer later busts).

The house advantage in Blackjack is relatively small at the outset. By keeping track of which cards have been dealt, a player can take advantage of the changing proportions of the remaining cards by betting higher amounts when there is an elevated proportion of 10-value cards and Aces and by better lower amounts when there is an elevated proportion of low-value cards. Over time, the deck will be unfavorable to the player more often than it is favorable, but by adjusting the amounts that he bets, the player can overcome that inherent disadvantage. The player can also use this information to refine basic strategy. For instance, basic strategy calls for hitting on a 16 when the dealer's up card is a 10, but if the player knows that the deck has a disproportionately small number of low-value cards remaining, the odds may be altered in favor of standing on the 16.

There are a number of card-counting schemes, all dependent for their efficacy on the player's ability to remember either a simplified or detailed tally of the cards that have been played. The more detailed the tally, the more accurate it is, but the harder it is to remember. Although card counting is not illegal, casinos will eject or ban successful card counters if they are detected.

Shuffle tracking is a more obscure, and difficult, method of attempting to shift the odds in favor of the player. The player attempts to track groups of cards during the play of a multi-deck shoe, follow them through the shuffle, and then looks for the same group to reappear from the new shoe, playing and betting accordingly.

XII. Tracking the Action at a Table

U.S. Pat. No. 6,579,181 generally describes, "a system for automatically monitoring playing and wagering of a game. In one illustrated embodiment, the system includes a card deck reader that automatically reads a respective symbol from each card in a deck of cards before a first one of the cards is removed from the deck. The symbol identifies a value of the card in terms of rank and suit, and can take the form of a machine-readable symbol, such as a bar code, area or matrix code or stacked code. In another aspect, the system does not decode the read symbol until the respective card is dealt, to ensure security.

"In another aspect, the system can include a chip tray reader that automatically images the contents of a chip tray. The system periodically determines the number and value of chips in the chip tray from the image and compares the change in contents of the chip tray to the outcome of game play to verify that the proper amounts have been paid out and collected.

"In a further aspect, the system can include a table monitor that automatically images the activity or events occurring at a gaming table. The system periodically compares images of the gaming table to identify wagering, as well as the appearance, removal and position of cards and/or other objects on the gaming table. The table monitoring system can be unobtrusively located in the chip tray."

U.S. Pat. No. 6,579,181 generally describes "a drop box that automatically verifies an amount and authenticity of a deposit and reconciles the deposit with a change in the contents of the chip tray. The drop box can image different portions of the deposited item, selecting appropriate lighting and resolutions to examine security features in the deposited item.

"In another aspect, the system can employ some, or all of the components to monitor the gaming habits of players and the performance of employees. The system can detect suspect playing and wagering patterns that may be prohibited. The system can also identify the win/loss percentage of the players and the dealer, as well as a number of other statistically relevant measures. Such measures can provide a casino or other gaming establishment with enhanced automated security, and automated real-time accounting. The measures can additionally provide a basis for automatically allocating complimentary benefits to the players."

Various embodiments include an apparatus, method and system which utilizes a card dispensing shoe with scanner and its associated software which enable the card dealer when dealing the game from a card dispensing shoe with scanner preferably placed on a game table where the twenty-one game to be evaluated by the software is being played, to use one or more keyboard(s) and/or LCD displays coupled to the shoe to identify for the computer program the number of the active players' seats, or active players, including the dealer's position relative thereto and their active play at the game table during each game round dealt from the shoe. These keyboards and LCD displays are also used to enter other data relevant to each seat's, or player's, betting and/or decision strategies for each hand played. The data is analyzed by a computer software program designed to evaluate the strategy decisions and betting skills of casino twenty-one, or blackjack players playing the game of blackjack during real time. The evaluation software is coupled to a central processing unit (CPU) or host computer that is also coupled to the shoe's keyboard(s) and LCD displays. The dealer using one or more keyboard(s) attached to or carried by the shoe, or a keyboard(s) located near the dealer is able to see and record the exact amount bet by each player for each hand played for the game to be evaluated. The optical scanner coupled to the CPU reads the value of each card dealt to each player's hand(s) and the dealer's hand as each card is dealt to a specific hand, seat or position and converts the game card value of each card dealt from the shoe to the players and the dealer of the game to a card count system value for one or more card count systems programmed into the evaluation software. The CPU also records each players decision(s) to hit a hand, and the dealer's decision to hit or take another card when required by the rules of the game, as the hit card is removed from the shoe. The dealer uses one or more of the keyboards and LCD displays carried by the shoe to record each player's decision(s) to Insure, Surrender, Stand, Double Down, or Split a hand. When the dealer has an Ace or a Ten as an up-card, he/she may use one or more of the keyboards to prompt the computer system's software, since the dealer's second card, or hole-card, which is dealt face down, has been scanned and the game card value thereof has been imported into the computer systems software, to instantly inform the dealer, by means of one or more of the shoe's LCDs, if his/her game cards, or hand total, constitutes a two-card "21" or "Blackjack".

In various embodiments, a card playing system for playing a card game which includes a card delivery shoe apparatus for use in dealing playing cards to at least one player for the playing of the card game comprises, in combination, housing means having a chute for supporting at least one deck of playing cards for permitting movement of the playing cards one at a time through the chute, the housing means having an outlet opening that permits the playing cards of the deck to be moved one-by-one out of the housing means during the play of a card game, card scanning means located within the housing means for scanning indicia located on each of the playing cards as each of the playing cards are moved out from the chute of the housing means, means for receiving the output of the card scanning means for identifying each of the playing cards received by each player from the shoe, for evaluating information relative to each players received playing cards and their values with information as to playing tactics used by each player relative to the values of the received playing cards, and for combining all of this information for identifying each player's playing strategy, and a playing table coupled to the card delivery shoe apparatus and having at least one keypad means located thereon for permitting at least one player to select various card playing options to wager upon.

In various embodiments, a card playing system for playing a card game which includes a card delivery shoe apparatus for use in dealing playing cards to at least one player for the playing of the card game comprises, in combination, housing means having a chute for supporting at least one deck of playing cards for permitting movement of the playing cards one at a time through the chute, the housing means having an outlet opening that permits the playing cards of the deck to be moved one-by-one out of the housing means during the play of a card game, card scanning means located within the housing means for scanning indicia located on each of the playing cards as each of the playing cards are moved out from the chute of the housing means, means for receiving the output of the card scanning means for identifying such of the playing cards received by each player from the shoe apparatus, for evaluating information relative to each player's received playing cards and their values with information as to betting tactics used by each player relative to playing cards previously dealt out from the shoe apparatus providing card count information, and for combining all of this information for identifying each player's card count strategy, and a playing table coupled to the card delivery shoe apparatus and having at least one keypad means located thereon for permitting the at least one player to select at least one of various card playing options to wager upon.

In various embodiments, a card playing system for playing a card game which includes a card delivery shoe apparatus for use in dealing playing cards to at least one player for the playing of a card game comprises, in combination, housing means having a chute for supporting at least one deck of playing cards for permitting movement of the playing cards one at a time through the chute, the housing means having an outlet opening that permits the playing cards of the deck to be moved one-by-one out of the housing means during the play of a card game, card scanning means located within the housing means for scanning indicia located on each of the playing cards as each of the playing cards are moved out from the chute of the housing means, means for receiving the output of the card scanning means for identifying each of the playing cards received by each player from the shoe apparatus, for evaluating information relative to each player's received playing cards and their values with information as to playing tactics used by each player relative to the values of the received playing cards, for combining use of all of this information for identifying each player's playing strategy, and for also identifying each player's card count strategy based on each player's betting tactics used by each player relative to playing cards previously dealt out from the shoe apparatus providing card count information, and a playing table coupled to the card delivery shoe apparatus and having at least one keypad means located thereon for permitting the at least one player to select at least one of various card playing options to wager upon.

In various embodiments, a secure game table system, adapted for multiple sites under a central control, allows for the monitoring of hands in a progressive live card game. A live card game has at least one deck, with each deck having a predetermined number of cards. Each game table in the system has a plurality of player positions with or without players at each position and a dealer at a dealer position.

In one embodiment, for providing additional security, a common identity code is located on each of the cards in each deck. Each deck has a different common identity code. A shuffler is used to shuffle the decks together and the shuffler has a circuit for counting of the cards from a previous hand that are inserted into the shuffler for reshuffling. The shuffler circuit counts each card inserted and reads the common identity code located on each card. The shuffler circuit issues a signal corresponding to the count and the common identity code read. The game control (e.g., the computer) located at each table receives this signal from the shuffler circuit and verifies that no cards have been withdrawn from the hand by a player (or the dealer) or that no new cards have been substituted. If the count is not proper or if a game card lacks an identity code or an identity code is mismatched, an alarm signal is generated indicating that a new deck of cards needs to be used and that the possibility of a breach in the security of the game has occurred.

In yet another embodiment of security, a unique code, such as a bar code, is placed on each card and as each card is dealt by the dealer from a shoe, a detector reads the code and issues a signal to the game control containing at least the value and the suit of each card dealt in the hand. The detector may also read a common identity deck code and issue that as a signal to the game control. The shoe may have an optical scanner for generating an image of each card as it is dealt from the shoe by the dealer in a hand. The game control stores this information in a memory so that a history of each card dealt from the shoe in a hand is recorded.

In yet another embodiment of security, an integrated shuffler/shoe obtains an optical image of each card dealt from the shoe for a hand and for each card inserted into the shuffler after a hand. These images are delivered to the game control where the images are counted and compared. When an irregular count or comparison occurs, an alarm is raised. The shuffler and shoe are integrated to provide security between the two units.

In another embodiment of security for a live card game, a game bet sensor is located near each of the plurality of player positions for sensing the presence of a game bet. The game bet sensor issues a signal counting the tokens placed. It is entirely possible that game bet sensors at some player positions do not have bets, and therefore, the game control that is receptive of these signals identifies which player positions have players placing game bets. This information is stored in memory and becomes part of the history of the game.

In another embodiment of security, a progressive bet sensor is located at each of the plurality of player positions and senses the presence of a progressive bet. The progressive bet sensor issues a signal that is received by the game control, which records in memory the progressive bets being placed at the respective player position sensed. If a progressive bet is sensed and a game bet is not, the game control issues an alarm signal indicating improper betting. At this point, the game control knows the identity of each player location having placed a game bet and, of those player positions having game bets placed, which player positions also have a progressive bet. This is stored in memory as part of the history of the hand.

In yet another embodiment of security, a card sensor is located near each player position and the dealer position. The card sensor issues a signal for each card received at the card sensor. The game control receives this issued signal and correlates those player positions having placed a game bet with the received cards. In the event a player position without a game bet receives a card or a player position with a game bet receives a card out of sequence, the game control issues an alarm. This information is added to the history of the game in memory, and the history contains the value and suit of each card delivered to each player position having a game bet.

A progressive jackpot display may be located at each game table and may display one or more jackpot awards for one or more winning combinations of cards. In one embodiment of the present invention, the game control at each table has stored in memory the winning combinations necessary to win the progressive jackpots. Since the game control accurately stores the suit and value of each card received at a particular player position, the game control can automatically detect a winning combination and issue an award signal for that player position. The dealer can then verify that that player at that position indeed has the correct combination of cards. The game control continuously updates the central control interconnected to all other game tables so that the central control can then inform all game tables of this win including, if desirable, the name of the winner and the amount won.

The central control communicates continuously with each game control and its associated progressive jackpot display may receive over a communication link all or part of the information stored in each game control.

Various embodiments include a card shoe with a device for automatic recognition and tracking of the value of each gaming card drawn out of the card shoe in a covered way (face down).

Various embodiments include a gaming table with a device for automatic recognition of played or not played boxes (hands), whereby it has to realize multiple bets on each hand and the use of insurance lines. Furthermore, the gaming table may include a device to recognize automatically the number of cards placed in front of each player and the dealer.

Various embodiments include the recognition, tracking, and storage of gaming chips.

In various embodiment, an electronic data processing (EDP) program may process the value of all bets on each box and associated insurance line, control the sequence of delivery of the cards, control the distribution of the gaming cards to each player and the dealer, may calculate and compare the total score of each hand and the dealer's, and may evaluate the players' wins.

Gaming data may then be processed by means of the EDP program and shown simultaneously to the actual game at a special monitor or display. Same data may be recalled later on to monitor the total results whenever requested.

Various embodiments include a gaming table and a gaming table cloth arranged on the gaming table, the gaming table cloth provided with betting boxes and areas designated for placement of the gaming chips and other areas designated for placement of the playing cards, a card shoe for storage of one or more decks of playing cards, this card shoe including means for drawing individual ones of the playing cards face down so that a card value imprint on the drawn card is not visible to a player of the game of chance, a card recognition means for recognizing this card value imprint on the drawn card from the card shoe, this card recognition means being located in the card shoe, an occupation detector unit including means for registering a count of gaming chips placed on the designated areas and another count of playing cards placed on the other designated areas on the table cloth, this occupation detector unit being located under the table cloth and consisting of multiple single detectors allocated to each betting box, each area for chips and each other area for playing cards respectively, a gaming bet detector for automatic recognition or manual input of gaming bets, and a computer including means for evaluating the play of the game of chance according to the rules of the game of chance, means for storing results of the play of the game of chance and means for displaying a course of the play of the game of chance and the results from electronic signals input from the gaming bet detector, the occupation detector unit and the card recognition means.

According to various embodiments, the card recognition means comprises an optical window arranged along a movement path of the card image imprint on the playing card drawn from the card shoe; a pulsed light source for illuminating a portion of the drawn playing card located opposite the optical window; a CCD image converter for the portion of the drawn playing card located opposite the optical window; an optical device for deflecting and transmitting a reflected image of the card value imprint from the drawn playing card to the CCD image converter from that portion of the drawn playing card when the drawn card is exactly in a correct drawn position opposite the optical window; and sensor means for detecting movement of the drawn card and for providing a correct timing for operation of the pulsed light source for transmission of the reflected image to the CCD image converter. The optical device for deflecting and transmitting the reflected image can comprise a mirror arranged to deflect the reflected image to the CCD image converter. Alternatively, the optical device for deflecting and transmitting the reflected image comprises a reflecting optical prism having two plane surfaces arranged at right angles to each other, one of which covers the optical window and another of which faces the CCD image converter and comprises a mirror, and the pulsed light source is arranged behind the latter plane surface so as to illuminate the drawn card when the drawn card is positioned over the optical window. Advantageously the sensor means for detecting movement of the drawn card and for providing a correct timing comprises a single sensor, preferably either a pressure sensor or a photoelectric threshold device, for sensing a front edge of the drawn card to determine whether or not the drawn card is being drawn and to activate the CCD image converter and the pulsed light source when a back edge of the drawn card passes the sensor means. Alternatively, the sensor means can include two electro-optical sensors, one of which is located beyond a movement path of the card image imprint on the drawn playing card and another of which is located in a movement path of the card image imprint on a drawn playing card. The latter electro-optical sensor can includes means for activating the pulsed light source by sensing a color trigger when the card value imprint passes over the optical window. In preferred embodiments of the card shoe the pulsed light source comprises a Xenon lamp.

In various embodiments of the gaming apparatus the single detectors of the occupation detector unit each comprise a light sensitive sensor for detection of chips or playing cards arranged on the table cloth over the respective single detector. Each single detector can be an infrared sensitive photodiode, preferably a silicon photodiode. Advantageously the single detectors can be arranged in the occupation detector unit so that the chips or playing cards placed over them on the tablecloth are arrange over at least two single detectors.

The gaming apparatus may include automatic means for discriminating colored markings or regions on the chips and for producing a bet output signal in accordance with the colored markings or regions and the number of chips having identical colored markings or regions.

The gaming bet detector may include automatic means for discriminating between chips of different value in the game of chance and means for producing a bet output signal in accordance with the different values of the chips when the chips are bet by a player. In various embodiments the gaming bet detector includes a radio frequency transmitting and receiving station and the chips are each provided with a transponder responding to the transmitting and receiving station so that the transponder transmits the values of the bet chips back to the transmitting and receiving station.

The connection between the individual units of the gaming apparatus and the computer can be either a wireless connection or a cable connection.

XIV. Following the Bets

Various embodiments include a smart card delivery shoe that reads the suit and rank of each card before it is delivered to the various positions where cards are to be dealt in the play of the casino table card game. The cards are then dealt according to the rules of the game to the required card positions. Different games have diverse card distribution positions, different card numbers, and different delivery sequences that the hand identifying system of the invention must encompass. For example, in the most complex of card distribution games of blackjack, cards are usually dealt one at a time in sequence around a table, one card at a time to each player position and then to the dealer position. The one card at a time delivery sequence is again repeated so that each player position and the dealer position have an initial hand of exactly two cards. Complexity in hand development is introduced because players have essentially unlimited control over additional cards until point value in a hand exceeds a count of twenty-one. Players may stand with a count of 2 (two aces) or take a hit with a count of 21 if they are so inclined, so the knowledge of the count of a hand is no assurance of what a player will do. The dealer, on the other hand, is required to follow strict house rules on the play of the game according to the value of the dealer's hand. Small variances such as allowing or disallowing a hit on a "soft" seventeen count (e.g., an Ace and a 6) may exist, but the rules are otherwise very precise so that the house or dealer cannot exercise any strategy.

Other cards games may provide equal numbers of cards in batches. Variants of stud poker played against a dealer, for example, would usually provide hands of five cards, five at a time to each player position and if competing against a dealer, to the dealer position. This card hand distribution is quite simple to track as each sequence of five cards removed from the dealer shoe is a hand.

Other games may require cards to be dealt to players and other cards dealt to a flop or common card area. The system may also be programmable to cover this alternative if it is so desired.

Baccarat is closer to blackjack in card sequence of dealing but has more rigid rules as to when hits may be taken by the player and the dealer, and each position may take a maximum of one card as a hit. The hand identification system of the invention must be able to address the needs of identifying hands in each of these types of games and especially must be able to identify hands in the most complex situation, the play of blackjack.

In various embodiments, where cameras are used to read cards, the light sensitive system may be any image capture system, digital or analog, that is capable of identifying the suit and rank of a card.

In various embodiments, a first step in the operation is to provide a set of cards to the smart delivery shoe, the cards being those cards that are going to be used in the play of a casino table card game. The set of cards (usually one or more decks) is provided in an already randomized set, being taken out of a shuffler or having been shuffled by hand. A smart delivery shoe is described in U.S. patent application Ser. No. 10/622,321, titled SMART DELIVERY SHOE, which application is incorporated herein in its entirety by reference. Some delivery systems or shoes with reading capability include but are not limited to those disclosed in U.S. Pat. Nos. 4,750,743; 5,779,546; 5,605,334; 6,361,044; 6,217,447; 5,941,769; 6,229,536; 6,460,848; 5,722,893; 6,039,650; and 6,126,166. In various embodiments, the cards are read in the smart card delivery shoe, such as one card at a time in sequence. Reading cards by edge markings and special codes (as in U.S. Pat. No. 6,460,848) may require special encoding and marking of the cards. The entire sequence of cards in the set of cards may thus be determined and stored in memory. Memory may be at least in part in the smart delivery shoe, but communication with a central processor is possible. The sequence would then also or solely be stored in the central computer.

In various embodiments, the cards are then dealt out of the smart delivery shoe, the delivery shoe registering how many cards are removed one-at-a-time. This may be accomplished by the above identified U.S. patent application Ser. No. 10/622,321 where cards are fed to the dealer removal area one at a time, so only one card can be removed by the dealer. As each card is removed, a signal is created indicating that a specific card (of rank and suit) has been dealt. The computer and system knows only that a first card has been dealt, and it is presumed to go to the first player. The remaining cards are dealt out to players and dealer. In the play of certain games (e.g., stud variants) where specific numbers of cards are known to be dealt to each position, the shoe may be programmed with the number of players at any time, so hands can be correlated even before they have been dealt. If the shoe is playing a stud variant where each player and the dealer gets three cards (Three Card Poker™ game), the system may know in advance of the deal what each player and the dealer will have as a hand. It is also possible that there be a signal available when the dealer has received either his first card (e.g., when cards are dealt in sequence, one-at-a-time) or has received his entire hand. The signal may be used to automatically determine the number of player positions active on the table at any given time. For example, if in a hand of blackjack the dealer receives the sixth card, the system may immediately know that there are five players at the table. The signal can be given manually (pressing a button at the dealer position or on the smart card delivery shoe) or can be provided automatically (a card presence sensor at the dealer's position, where a card can be placed over the sensor to provide a signal). Where an automatic signal is provided by a sensor, some physical protection of the sensor may be provided, such as a shield that would prevent accidental contact with the sensor or blockage of the sensor. An L-shaped cover may be used so a card could be slid under the arm of the L parallel to the table surface and cover the sensor under that branch of the L. The signal can also be given after all cards for the hand have been delivered, again indicating the number of players, For example, when the dealer's two cards are slid under the L-shaped cover to block or contact the sensor, the system may know the total number of cards dealt on the hand (e.g., 10 cards), know that the dealer has 2 cards, determine that players therefore have 8 cards, and know that each player has 2 cards each, thereby absolutely determining that there are four active player positions at the table (10−2=8 and then 8/2=4 players). This automatic determination may serve as an alternative to having dealers input the number of players each hand at a table or having to manually change the indicated number of players at a table each time the number changes.

Once all active positions have been dealt to, the system may now know what cards are initially present in each player's hand, the dealer's hand, and any flop or common hand. The system operation may now be simple when no more cards are provided to play the casino table game. All hands may then be known, and all outcomes may be predicted. The complication of additional cards will be addressed with respect to the game of blackjack.

After dealing the initial set of two cards per hand, the system may not immediately know where each remaining card will be dealt. The system may know what cards are dealt, however. It is with this knowledge and a subsequent identification of discarded hands that the hands and cards from the smart delivery shoe can be reconciled or verified. Each hand is already identified by the presence of two specifically known cards. Hands are then played according to the rules of the game, and hands are discarded when play of a hand is exhausted. A hand is exhausted when 1) there is a blackjack, the hand is paid, and the cards are cleared; 2) a hand breaks with a count over twenty-one and the cards are cleared; and/or a round of the game is played to a conclusion, the dealer's hand completed, all wagers are settled, and the cards are cleared. As is typically done in a casino to enable reconciling of hands manually, cards are picked up in a precise order from the table. The cards are usually cleared from the dealer's right to the dealer's left, and the cards at each position comprise the cards in the order that they were delivered, first card on the bottom, second card over the first card, third card over the second card, etc. maintaining the order or a close approximation of the order (e.g., the first two cards may be reversed) is important as the first two cards form an anchor, focus, basis, fence, end point or set edge for each hand. For example, if the third player position was known to have received the 10 of hearts (10H) and the 9 of spades (9S) for the first two card, and the fourth player was known to receive the 8 of diamonds (8D) and the 3 of clubs (3C) for the first two cards, the edges or anchors of the two hands are 9S/10H and 8D/3C. When the hands are swept at the conclusion of the game, the cards are sent to a smart discard rack (e.g., see U.S. patent application Ser. No. 10/622,388, which application is incorporated herein by reference in its entirety) and the hand with the 9S/10H was not already exhausted (e.g., broken or busted) and the swept cards consist of 9S, 10H, 8S, 8D and 3C (as read by the smart discard rack), the software of the processor may automatically know that the final hands in the third and fourth positions were a count of 19 (9S and 10H) for the third hand and 19 (8D and 3C originally plus the 8S hit) for the fourth hand. The analysis by the software specifically identifies the fourth hand as a count of 19 with the specific cards read by the smart discard shoe. The information from reading that now exhausted hand is compared with the original information collected from the smart delivery shoe. The smart delivery shoe information when combined with the smart discard rack information shall confirm the hands in each position, even though cards were not uniformly distributed (e.g., player one takes two hits for a total of four cards, player two takes three hits for a total of five cards, player three takes no hit for a total of two cards, player four takes one hit for a total of three cards, and the dealer takes two hits for a total of four cards).

The dealer's cards may be equally susceptible to analysis in a number of different formats. After the last card has been dealt to the last player, a signal may be easily and imperceptibly generated that the dealer's hand will now become active with possible hits. For example, with the sensor described above for sensing the presence of the first dealer card or the completion of the dealer's hand, the cards would be removed from beneath the L-shaped protective bridge. This type of movement is ordinarily done in blackjack where the dealer has at most a single card exposed, and one card buried face down. In this case, the removal of the cards from over the sensor underneath the L-cover to display the hole card is a natural movement and then exposes the sensor. This can provide a signal to the central processor that the dealer's hand will be receiving all additional cards in that round of the game. The system at this point knows the two initial cards in the dealer's hand, knows the values of the next sequence of cards, and knows the rules by which a dealer must play. The system knows what cards the dealer will receive and what the final total of the dealer's hand will be because the dealer has no freedom of decision or movement in the play of the dealer's hand. When the dealer's hand is placed into the smart discard rack, the discard rack already knows the specifics of the dealer's hand even without having to use the first two cards as an anchor or basis for the dealer's hand. The cards may be treated in this manner in some embodiments.

When the hands are swept from the table, dealer's hand then players' hands from right to left (from the dealer's position or vice-versa if that is the manner of house play), the smart discard rack reads the shoes, identifies the anchors for each hand, knows that no hands swept at the conclusion can exceed a count of twenty-one, and the computer identifies the individual hands and reconciles them with the original data from the smart delivery shoe. The system thereby can identify each hand played and provide system assurance that the hand was played fairly and accurately.

If a lack of reconciling by the system occurs, a number of events can occur. A signal can be given directly to the dealer position, to the pit area, or to a security zone and the cards examined to determine the nature and cause of the error and inspect individual cards if necessary. When the hand and card data is being used for various statistical purposes, such as evaluating dealer efficiency, dealer win/loss events, player efficiency, player win/loss events, statistical habits of players, unusual play tactics or meaningful play tactics (e.g., indicative of card counting), and the like, the system may file the particular hand in a 'dump' file so that hand is not used in the statistical analysis, this is to assure that maximum benefits of the analysis are not tilted by erroneous or anomalous data.

Various embodiments may include date stamping of each card dealt (actual time and date defining sequence, with concept of specific identification of sequence identifier possibly being unique). The date stamping may also be replaced by specific sequence stamping or marking, such as a specific hand number, at a specific table, at a specific casino, with a specific number of players, etc. The records could indicate variations of indicators in the stored memory of the central computer of Lucky 777 Casino, Aug. 19, 1995, 8:12:17 a.m., Table 3, position 3, hand 7S/4D/9S, or simply identify something similar by alphanumeric code as L7C-819-95-3-3-073-7S/4D/9S (073 being the $73^{rd}$ hand dealt). This date stamping of hands or even cards in memory can be used as an analytical search tool for security and to enhance hand identification.

FIG. 1 shows a block diagram of the minimum components for the hand-reading system on a table 4 of the invention, a smart card-reading delivery shoe 8 with output 14 and a smart card-reading discard rack 12 with output 18. Player positions 6 are shown, as is a dealer's hand position sensor 10 without output port 16.

The use of the discard rack acting to reconcile hands returned to the discard rack out-of-order (e.g., blackjack or bust) automatically may be advantageous, in some embodiments. The software as described above can be programmed to recognize hands removed out-of-dealing order on the basis of knowledge of the anchor cards (the first two cards) known to have been dealt to a specific hand. For example, the software will identify that when a blackjack was dealt to position three, that hand will be removed, the feed of the third hand into the smart card discard tray confirms this, and position three will essentially be ignored in future hand resolution. More importantly, when the anchor cards were, for example, 9S/5C in the second player position and an exhausted hand of 8D/9S/5C is placed into the smart discard rack, that hand will be identified as the hand from the second player position. If two identical hands happen to be dealt in the same round of play, the software will merely be alerted (it knows all of the hands) to specifically check the final order of cards placed into the smart discard rack to more carefully position the location of that exhausted hand. This is merely recognition software implementation once the concept is understood.

That the step of removal of cards from the dealer's sensor or other initiated signal identifies that all further cards are going to the dealer may be useful in defining the edges of play between rounds and in identifying the dealer's hand and the end of a round of play. When the dealer's cards are deposited and read in the smart discard rack, the central computer knows that another round of play is to occur, and a mark or note may be established that the following sequence will be a new round and the analytical cycle may begin all over again.

The discard rack indicates that a complete hand has been delivered by absence of additional cards in the Discard Rack in-feed tray. When cards are swept from an early exhausted hand (blackjack or a break), they are swept one at a time and inserted into the smart discard rack one at a time. When the smart discard rack in-feed tray is empty, the system understands that a complete hand has been identified, and the system can reconcile that specific hand with the information from the smart delivery shoe. The system can be hooked-up to feed strategy analysis software programs such as the SMI licensed proprietary Bloodhound™ analysis program.

Various embodiments include a casino or cardroom game modified to include a progressive jackpot component. During the play of a Twenty-One game, for example, in addition to this normal wager, a player will have the option of making an additional wager that becomes part of, and makes the player eligible to win, the progressive jackpot. If the player's Twenty-One hand comprises a particular, predetermined arrangement of cards, the player will win all, or part of, the amount showing on the progressive jackpot. This progressive jackpot feature is also adaptable to any other casino or cardroom game such as Draw Poker, Stud Poker, Lo-Ball Poker or Caribbean Stud™ Poker. Various embodiments include a gaming table, such as those used for Twenty-One or poker, modified with the addition of a coin acceptor that is electronically connected to a progressive jackpot meter. When player drops a coin into the coin acceptor, a light is activated at the player's location indicating that he is participating in the progressive jackpot component of the game during that hand. At the same time, a signal from the coin acceptor is sent to the progressive meter to increment the amount shown on the progressive meter. At the conclusion of the play of each hand, the coin acceptor is reset for the next hand. When a player wins all or part of the progressive jackpot, the amount showing on the progressive jackpot meter is reduced by the amount won by the player. Any number of gaming tables can be connected to a single progressive jackpot meter.

XV. Card Shufflers

Various embodiments include an automatic card shuffler, including a card mixer for receiving cards to be shuffled in first and second trays. Sensors detect the presence of cards in these trays to automatically initiate a shuffling operation, in which the cards are conveyed from the trays to a card mixer, which randomly interleaves the cards delivered to the mixing mechanism and deposits the interleaved cards in a vertically aligned card compartment.

A carriage supporting an ejector is reciprocated back and forth in a vertical direction by a reversible linear drive while the cards are being mixed, to constantly move the card ejector along the card receiving compartment. The reversible linear drive is preferably activated upon activation of the mixing means and operates simultaneously with, but independently of, the mixing means. When the shuffling operation is terminated, the linear drive is deactivated thereby randomly positioning the card ejector at a vertical location along the card receiving compartment.

A sensor arranged within the card receiving compartment determines if the stack of cards has reached at least a predetermined vertical height. After the card ejector has stopped and, if the sensor in the compartment determines that the stack of cards has reached at least the aforesaid predetermined height, a mechanism including a motor drive, is activated to move the wedge-shaped card ejector into the card receiving compartment for ejecting a group of the cards in the stack, the group selected being determined by the vertical position attained by the wedge-shaped card ejector.

In various embodiments, the card ejector pushes the group of cards engaged by the ejector outwardly through the forward open end of the compartment, said group of cards being displaced from the remaining cards of the stack, but not being completely or fully ejected from the stack.

The card ejector, upon reaching the end of its ejection stroke, detected by a microswitch, is withdrawn from the card compartment and returned to its initial position in readiness for a subsequent shuffling and card selecting operation.

In various embodiments, a technique for randomly selecting the group of cards to be ejected from the card compartment utilizes solid state electronic circuit means, which may comprise either a group of discrete solid-state circuits or a microprocessor, either of which techniques preferably employ a high frequency generator for stepping a N-stage counter during the shuffling operation. When the shuffling operation is completed, the stepping of the counter is terminated. The output of the counter is converted to a DC signal, which is compared against another DC signal representative of the vertical location of the card ejector along the card compartment.

In various embodiments, a random selection is made by incrementing the N-stage counter with a high frequency generator. The high frequency generator is disconnected from the N-stage counter upon termination of the shuffling operation. The N-stage counter is then incremented by a very low frequency generator until it reaches its capacity count and resets. The reciprocating movement of the card ejector is terminated after completion of a time interval of random length and extending from the time the high frequency generator is disconnected from the N-stage counter to the time that the counter is advanced to its capacity count and reset by the low frequency generator, triggering the energization of the reciprocating drive, at which time the card ejector carriage coasts to a stop.

In various embodiments, the card ejector partially ejects a group of cards from the stack in the compartment. The partially displaced group of cards is then manually removed from the compartment. In another preferred embodiment, the ejector fully ejects the group of cards from the compartment, the ejected cards being dropped into a chute, which delivers the cards directly to a dealing shoe. The pressure plate of the dealing shoe is initially withdrawn to a position enabling the cards passing through the delivery shoe to enter directly into the dealing shoe and is thereafter returned to its original position at which it urges the cards towards the output end of the dealing shoe.

Various embodiments include a method and apparatus for automatically shuffling and cutting playing cards and delivering shuffled and cut playing cards to the dispensing shoe without any human intervention whatsoever once the playing cards are delivered to the shuffling apparatus. In addition, the shuffling operation may be performed as soon as the play of each game is completed, if desired, and simultaneously with the start of a new game, thus totally eliminating the need to shuffle all of the playing cards (which may include six or eight decks, for example) at one time. Preferably, the cards played are collected in a "dead box" and are drawn from the dead box when an adequate number of cards have been accumulated for shuffling and cutting using the method of the present invention.

Various embodiments include a computer-controlled shuffling and cutting system provided with a housing having at least one transparent wall making the shuffling and card delivery mechanism easily visible to all players and floor management in casino applications. The housing is provided with a reciprocally slidable playing card pusher which, in the first position, is located outside of said housing. A motor-operated transparent door selectively seals and uncovers an opening in the transparent wall to permit the slidably mounted card pusher to be moved from its aforementioned first position to a second position inside the housing whereupon the slidably mounted card pusher is then withdrawn to the first position, whereupon the playing cards have been deposited upon a motorized platform which moves vertically and selectively in the upward and downward directions.

The motor driven transparent door is lifted to the uncovered position responsive to the proper location of the motor driven platform, detected by suitable sensor means, as well as depression of a foot or hand-operated button accessible to the dealer.

The motor driven platform (or "elevator") lifts the stack of playing cards deposited therein upwardly toward a shuffling mechanism responsive to removal of the slidably mounted card pusher and closure of the transparent door whereupon the playing cards are driven by the shuffling mechanism in opposing directions and away from the stack to first and second card holding magazines positioned on opposing sides of the elevator, said shuffling mechanism comprising motor driven rollers rotatable upon a reciprocating mounting device, the reciprocating speed and roller rotating speed being adjustable. Alternatively, however, the reciprocating and rotating speeds may be fixed; if desired, employing motors having fixed output speeds, in place of the stepper motors employed in one preferred embodiment.

Upon completion of a shuffling operation, the platform is lowered and the stacks of cards in each of the aforementioned receiving compartments are sequentially pushed back onto the moving elevator by suitable motor-driven pushing mechanisms. The order of operation of the pushing mechanisms is made random by use of a random numbers generator employed in the operating computer for controlling the system. These operations can be repeated, if desired. Typically, new cards undergo these operations from two to four times.

Guide assemblies guide the movement of cards onto the platform, prevent shuffled cards from being prematurely returned to the elevator platform and align the cards as they fall into the card receiving regions as well as when they are pushed back onto the elevator platform by the motor-driven pushing mechanism.

Upon completion of the plurality of shuffling and cutting operations, the platform is again lowered, causing the shuffled and cut cards to be moved downwardly toward a movable guide plate having an inclined guide surface.

As the motor driven elevator moves downwardly between the guide plates, the stack of cards engages the inclined guide surface of a substantially U-shaped secondary block member causing the stack to be shifted from a horizontal orientation to a diagonal orientation. Substantially simultaneously therewith, a "drawbridge-like" assembly comprised of a pair of swingable arms pivotally mounted at their lower ends, are swung downwardly about their pivot pin from a vertical orientation to a diagonal orientation and serve as a diagonally aligned guide path. The diagonally aligned stack of cards slides downwardly along the inclined guide surfaces and onto the draw bridge-like arms and are moved downwardly there along by the U-shaped secondary block member, under control of a stepper motor, to move cards toward and ultimately into the dealing shoe.

A primary block, with a paddle, then moves between the cut-away portion of the U-shaped secondary block, thus applying forward pressure to the stack of cards. The secondary block then retracts to the home position. The paddle is substantially rectangular-shaped and is aligned in a diagonal orientation. Upon initial set-up of the system the paddle is positioned above the path of movement of cards into the dealing shoe. The secondary block moves the cut and shuffled cards into the dealing shoe and the paddle is lowered to the path of movement of cards toward the dealing shoe and is moved against the rearward most card in the stack of cards delivered to the dealing shoe. When shuffling and cutting operations are performed subsequent to the initial set-up, the paddle rests against the rearward most card previously delivered to the dealing shoe. The shuffled and cut cards sliding along the guide surfaces of the diagonally aligned arms of the draw bridge-like mechanism come to rest upon the opposite surface of the paddle which serves to isolate the playing cards previously delivered to the dispensing shoe, as well as providing a slight pushing force urging the cards toward the outlet slot of the dispensing shoe thereby enabling the shuffling and delivering operations to be performed simultaneously with the dispensing of playing cards from the dispensing shoe.

After all of the newly shuffled playing cards have been delivered to the rear end of the dispensing shoe, by means of the U-shaped secondary block the paddle, which is sandwiched between two groups of playing cards, is lifted to a position above and displaced from the playing cards. A movable paddle mounting assembly is then moved rearwardly by a motor to place the paddle to the rear of the rearmost playing card just delivered to the dispensing shoe; and the paddle is lowered to its home position, whereupon the motor controlling movement of the paddle assembly is then deenergized enabling the rollingly-mounted assembly supporting the paddle to move diagonally downwardly as playing cards are dispensed from the dispensing shoe to provide a force which is sufficient to urge the playing cards forwardly toward the playing card dispensing slot of the dealing shoe. The force acting upon the paddle assembly is the combination of gravity and a force exerted upon the paddle assembly by a constant tension spring assembly. Jogging (i.e., "dither") means cause the paddle to be jogged or reciprocated in opposing forward and rearward directions at periodic intervals to assure appropriate alignment, stacking and sliding movement of the stack of playing cards toward the card dispensing slot of the dealing shoe.

Upon completion of a game, the cards used in the completed game are typically collected by the dealer and placed in a dead box on the table. The collected cards are later placed within the reciprocally movable card pusher. The dealer has the option of inserting the cards within the reciprocally slidable card pusher into the shuffling mechanism or, alternatively, and preferably, may postpone a shuffling operation until a greater number of cards have been collected upon the reciprocally slidable card pusher. The shuffling and delivery operations may be performed as often or as infrequently as the dealer or casino management may choose. The shuffling and playing card delivery operations are fully automatic and are performed without human intervention as soon as cards are inserted within the machine on the elevator platform. The cards are always within the unobstructed view of the players to enable the players, as well as the dealer, to observe and thereby be assured that the shuffling, cutting and card delivery operations are being performed properly and without jamming and that the equipment is working properly as well. The shuffling and card delivery operations do not conflict or interfere with the dispensing of cards from the dispensing shoe, thereby permitting these operations to be performed substantially simultaneously, thus significantly reducing the amount of time devoted to shuffling and thereby greatly increasing the playing time, as well as providing a highly efficient random shuffling and cutting mechanism.

The system may be controlled by a microcomputer programmed to control the operations of the card shuffling and cutting system. The computer controls stepper motors through motor drive circuits, intelligent controllers and an opto-isolator linking the intelligent controllers to the computer. The computer also monitors a plurality of sensors to assure proper operation of each of the mechanisms of the system.

XVI. Casino Countermeasures

Some methods of thwarting card counters include using a large number of decks. Shoes containing 6 or 8 decks are common. The more cards there are, the less variation there is in the proportions of the remaining cards and the harder it is to count them. The player's advantage can also be reduced by shuffling the cards more frequently, but this reduces the amount of time that can be devoting to actual play and therefore reduces the casino profits. Some casinos now use shuffling machines, some of which shuffle one set of cards while another is in play, while others continuously shuffle the cards. The distractions of the gaming floor environment and complimentary alcoholic beverages also act to thwart card counters. Some methods of thwarting card counters include using varied payoff structures, such Blackjack payoff of 6:5, which is more disadvantageous to the player than the standard 3:2 Blackjack payoff.

XVII. Video Wagering Games

Video wagering games are set up to mimic a table game using adaptations of table games rules and cards.

In one version of video poker the player is allowed to inspect five cards randomly chosen by the computer. These cards are displayed on the video screen and the player chooses which cards, if any, that he or she wishes to hold. If the player wishes to hold all of the cards, i.e., stand, he or she presses a STAND button. If the player wishes to hold only some of the cards, he or she chooses the cards to be held by pressing HOLD keys located directly under each card displayed on the video screen. Pushing a DEAL button after choosing the HOLD cards automatically and simultaneously replaces the unchosen cards with additional cards which are randomly selected from the remainder of the deck. After the STAND button is pushed, or the cards are replaced, the final holding is evaluated by the game machine's computer and the player is awarded either play credits or a coin payout as determined from a payoff table. This payoff table is stored in the machine's computer memory and is also displayed on the machine's screen. Hands with higher poker values are awarded more credits or coins. Very rare poker hands are awarded payoffs of 800-to-1 or higher.

XVIII. Apparatus for Playing Over a Communications System

Figure 2:
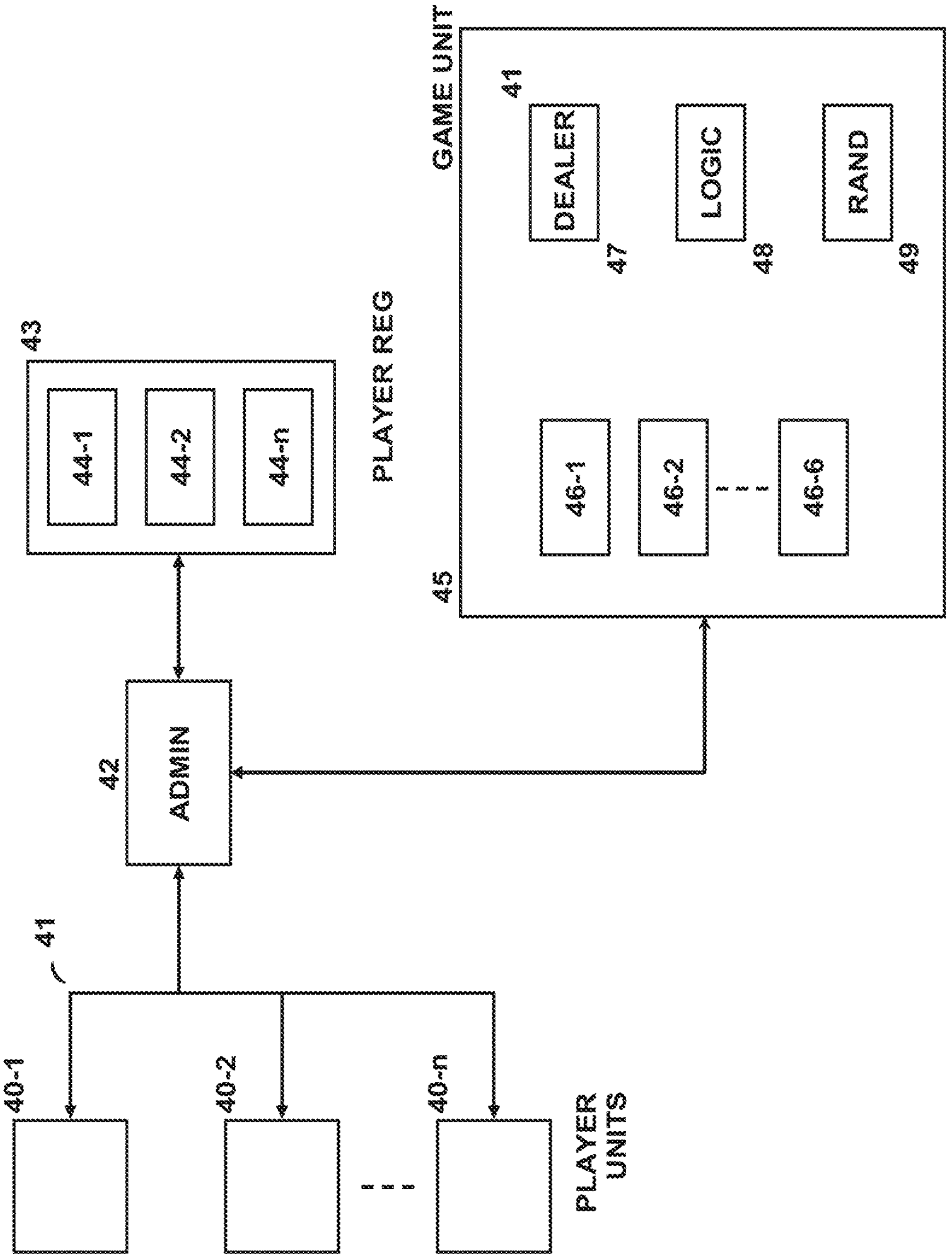
FIG. 2 shows an apparatus for playing a game, according to some embodiments.

FIG. 2 shows apparatus for playing the game. There is a plurality of player units 40-1 to 40-*n* which are coupled via a communication system 41, such as the Internet, with a game playing system comprising an administration unit 42, a player register 43, and a game unit 45. Each unit 40 is typically a personal computer with a display unit and control means (a keyboard and a mouse).

When a player logs on to the game playing system, their unit 40 identifies itself to the administration unit. The system holds the details of the players in the register 43, which contains separate player register units 44-1 to 44-*n* for all the potential players, i.e., for all the members of the system.

Once the player has been identified, the player is assigned to a game unit 45. The game unit contains a set of player data units 46-1 to 46-6, a dealer unit 47, a control unit 48, and a random dealing unit 49.

Up to seven players can be assigned to the game unit 45. There can be several such units, as indicated, so that several games can be played at the same time if there are more than seven members of the system logged on at the same time. The assignment of a player unit 40 to a player data unit 46 may be arbitrary or random, depending on which player data units 46 and game units 45 are free. Each player data unit 46 is loaded from the corresponding player register unit 44 and also contains essentially the same details as the corresponding player unit 40 and is in communication with the player unit 40 to keep the contents of the player unit and player data unit updated with each other. In addition, the appropriate parts of the contents of the other player data units 46 and the dealer unit 47 are passed to the player unit 40 for display.

The logic unit 48 of the game unit 45 steps the game unit through the various stages of the play, initiating the dealer actions and awaiting the appropriate responses from the player units 40. The random dealing unit 49 deals cards essentially randomly to the dealer unit 47 and the player data units 46. At the end of the hand, the logic unit passes the results of the hand, i.e. the wins and/or losses, to the player data units 46 to inform the players of their results. The administrative unit 42 also takes those results and updates the player register units 44 accordingly.

The player units 40 are arranged to show a display. To identify the player, the player's position is highlighted. As play proceeds, so the player selects the various boxes, enters bets in them, and so on, and the results of those actions are displayed. As the cards are dealt, a series of overlapping card symbols is shown in the Bonus box. At the option of the player, the cards can be shown in a line below the box, and similarly for the card dealt to the dealer. At the end of the hand, a message is displayed informing the player of the results of their bets, i.e., the amounts won or lost.

XIX. Alternative Technologies

It will be understood that the technologies described herein for making, using, or practicing various embodiments are but a subset of the possible technologies that may be used for the same or similar purposes. The particular technologies described herein are not to be construed as limiting. Rather, various embodiments contemplate alternate technologies for making, using, or practicing various embodiments.

XX. References

The following patents and patent applications are hereby incorporated by reference herein for all purposes: U.S. Pat. Nos. 6,579,181, 6,299,536, 6,093,103, 5,941,769, 7,114,718, U.S. patent application Ser. No. 10/622,321, U.S. Pat. Nos. 4,515,367, 5,000,453, 7,137,630, and 7,137,629.

XXI. Embodiments

In various embodiments, rules of a game may change depending on circumstances of the game. In some embodiments, rules of a casino game may change in order to offset a player advantage. In some embodiments, the rules of Blackjack may change based on an advantageous set of cards remaining in a deck.

As used herein, the term "deck" may refer to a set of cards from which cards are used in the conduct of a game. A deck may include more cards than are used in the game. The same deck may be used in the conduct of multiple games. As cards are supplied from the deck for use in a game, such cards may be removed from the deck. Such cards may then remain separate from the deck, or may be added back to the deck, e.g., after the game has concluded. The term "deck" may refer to a standard set of 52 cards containing four suits of thirteen ranks each. The term deck may also refer to a combination of several standard sets of 52 cards. The term deck may also refer to any combination of cards, standard or not.

As used herein, the terms "house edge" and "house advantage" may refer to an amount that the house is expected to retain, on average, per unit bet by the player. The house edge may be expressed in percentage terms. For example, a house edge of 5% may indicate that the house can expect to retain 5 cents on average per dollar bet by a player. It should be noted that a statement of a house edge does not imply that the house will necessarily retain the stated amount of a player's bet on each game. The house edge, rather, refers to an expectation or average. For example, suppose a player bets $1 on a game in which he has a 45% chance of winning $2, and a 55% chance of winning nothing. The house edge may be calculated as (0.55*($1−$0)+0.45*($1−$2))/$1=10%. Thus, the house may expect to win 10 cents per dollar wagered by the player.

1. Display of a count statistic to the player. In various embodiments, a player may be shown one or more statistics describing the current state of a deck of cards. The current state of the deck of cards may be based on the cards that were originally in the deck and cards that have been removed from the deck, e.g., through the dealing of hands of Blackjack.
   1.1. Show all the cards that have been played and/or all the cards remaining. In some embodiments, a player may be shown an indication of all or some of the cards that have been dealt or otherwise removed from a deck. Each card that has been dealt may be indicated separately using a text description of rank and suit, such as "Js" to indicate the Jack of spades, or "10h" to indicate the ten of hearts. It will be appreciated that many other text descriptions are possible. In some embodiments, graphical depictions of cards dealt may be displayed. For example, a display screen may show a graphical depiction of the faces of all cards that have been dealt. In some embodiments, a more condensed or summary indication is provided. For example, for each card rank, a number of such cards dealt may be indicated. For example, a display may indicate that there have been three Aces dealt, five Kings dealt, zero Queens dealt, and so on. For cards of similar value or significance in a game, further condensing may be possible. For example, a display may indicate that 17 ten-value cards have been dealt. In the game of Blackjack ten-value cards may include kings, queens, jacks, and tens. In some embodiments, a player is only shown an indication of all cards dealt from a deck that were openly revealed to players in a game. Thus, a player may be able to see all the cards that were dealt face up, but not burned cards or cards that were dealt to an individual player face-down and never revealed to other players. In some embodiments, a player may be shown an indication of some or all cards remaining in a deck. It will be appreciated that if all the original cards in a deck are known, and all the cards that have been dealt from the deck are known, the remaining cards in the deck may be readily deduced, e.g., through a process of elimination. It will be appreciated that if all the original cards in a deck are known, the unrevealed cards from a deck may be readily deduced from cards that have been revealed.
   1.2. Show a simplified statistic about the cards. E.g., the deck is ten-rich. In some embodiments, a statistic may be shown that provides information about the cards remaining in a deck and/or the cards taken from the deck. In the discussion that follows, the statistic will be said to apply to cards remaining in a deck. However, it will be appreciated that the statistic may apply to the aggregate of unknown or unrevealed cards, where unrevealed cards include both, those cards remaining in a deck and cards that have been removed from the deck but have not been shown to all players of a game (e.g., burn cards). Further, it will be appreciated that in many embodiments an equivalent statistic about cards that have been revealed can be shown given a statistic about cards that have not been revealed. For example, assume an original deck had 4 aces in it. A statistic stating that 3 aces had been dealt would be equivalent to a statistic that 1 ace remains among the unknown cards.

In various embodiments, one or more of the following statistics may be presented to a player with respect to a deck of cards: (a) the number of cards remaining in the deck having a particular rank; (b) the number of cards remaining in the deck having a particular point value; (c) the number of cards remaining in the deck which have one of a set of ranks (e.g., the number of cards remaining in the deck which are either Aces or tens); (d) the number of cards remaining in the deck which have one of a set of point values (e.g., the number of cards remaining in the deck which have point values of either 9, 10, or 1/11); (e) the number of aces remaining in the deck; (f) the number of cards with point values of 10 remaining in the deck; (g) the number of sevens remaining in the deck; (h) the number of cards remaining in the deck which are either aces, or cards worth 10 points; (i) the number of cards remaining in the deck which are either nines, eights, or sevens; (j) the number of cards remaining in the deck which are either twos, threes, fours, fives, or sixes; (k) the number of cards of a particular suit remaining in the deck; (1) the number of cards of a particular color remaining in the deck (e.g., red; e.g., black); (m) the number of red sevens remaining in the deck; (n) the number of black sevens remaining in the deck; (o) the number of cards of a particular rank and suit remaining in the deck (e.g., the number of aces of spades remaining in the deck); (p) the number of sevens of spades remaining in the deck; (q) the number of sevens of hearts remaining in the deck; (r) the number of cards remaining in the deck; (s) the number of cards remaining in the deck which are either twos, threes, fours, fives, or sixes, or sevens; and so on.

Sums or differences of any of the above statistics may be presented to a player. One statistic presented may be the difference between the number of cards remaining which are aces and ten-point cards, and the number of cards remaining which have ranks of two, three, four, five, or six. Such a statistic may represent a statistic used in the well-known "Hi-Low Count" system of counting cards. Another statistic presented may be the difference between the number of cards remaining which are aces and ten-point cards, and the number of cards remaining which have ranks of two, three, four, five, six or seven. Such a static may represent a statistic according to the well-known "K-O" or "Knock-Out" system of counting cards.

In some embodiments, linear or affine functions of any of the above statistics may be presented to a player. For example, a statistic may represent two times the number of aces remaining plus the number of ten-value cards remaining in a deck.

Ratios of any of the above statistics may be presented to a player. For example, the following statistic may be presented to a player:

52*(number of aces and ten-value cards remaining−number of cards ranked two through six remaining)/total number of cards remaining.

Such ratios or statistics may indicate a likelihood that a desired card or a set of desired cards may be dealt from the deck. For example, the above ratio may indicate the likelihood that an ace or ten card may be dealt from the remaining deck.

In some embodiments, a player may adjust such statistics as desired. For example, a player may desire a ten-value card to beet an opponent and may therefore request a statistic that indicates the likelihood of obtaining such a ten-valued card. A player may request such a statistic, for example, through a graphical user interface (e.g., through a computer menu, etc.).

1.3. Show a probability of an outcome. E.g., player wins with 40% chance. In various embodiments, a player may be shown a statistic representing the probability of result or outcome of a game. The player may be shown a probability that the player wins, a probability that the player will push or tie, and/or a probability that the player will lose. A player may be shown a probability that the dealer will win, a probability that the dealer will tie, and/or a probability that the dealer will lose. A player may be shown a probability that an opponent will win, tie, or lose. In some embodiments, a player may be shown the probability that he will achieve a particular hand. For example, the player may be shown a probability that he will achieve a blackjack. A player may be shown a probability that he will achieve a particular point total. For example, the player may be shown a probability that he will achieve a point total of 20. A player may be shown a probability that the dealer will achieve a particular hand, such as a blackjack. A player may be shown a probability that a dealer will achieve a particular point total. A player may be shown a probability that a dealer will bust, or a probability that the player will bust. A player may be shown a probability of a dealer obtaining a certain card, and/or obtaining a certain hand value. In some implementations, a player may be shown an expected value of performing a certain action.

1.4. Show a house edge. E.g., house edge is 0.4%. In some embodiments, a player may be shown a house edge. For example, a player may be shown that a house edge is 1%. In some embodiments, the player may be shown a player edge, i.e., an amount that a player can expect to win per unit wagered by the player. In some embodiments, the player may be shown an expected amount to be won. The statistic may be adjusted as a game is played so that at multiple points throughout the game, the current statistic is shown (e.g., each time the player is asked to bet).

1.5. Publish counts. In various embodiments, a value of a statistic, such as a card count, may be published. The value of the statistic may be disseminated. In various embodiments, the value of a statistic may be available to one or more players of a game of Blackjack. In various embodiments, the value of a statistic may be available to (e.g., communicated to) people who are not participants in the game for which the statistic applies. In various embodiments, non-participants may use the statistic for a game in various ways. For example, a non-participant may bet on what the value of a statistic will be in the future based on its current value.

1.5.1. Publish aggregate statistics. In various embodiments, an aggregate statistic may be published, communicated, or otherwise disseminated. The aggregate statistic may be based on two or more games of blackjack. For example, a statistic may include the sum of card counts at three individual Blackjack games. For example, if the card counts at three separate Blackjack games are 10, 3, and −6, then the value of the aggregate statistic published may be 7. An aggregate statistic may also include an average of statistics from individual games (e.g., an average count), a median of statistics from individual games, and so on.

1.5.2. Publish multiple statistics from separate games. In various embodiments, statistics from different games of blackjack may be published. The statistics may be published together. For example, the statistics may be posted on a public monitor or screen. The published statistics may allow people to decide which game of Blackjack to enter. If non-participants are able to make bets on games, the published statistics may allow such non-participants to decide which games to bet on. For example, a non-participant may wish to bet that the count in a particular game of Blackjack will reach 10 from its current value of 7.

1.5.3. Where to publish statistics. In various embodiments, statistics may be published in a variety of different places. A statistic may be published, for example, on a public monitor, on the screen of a gaming device, on the display screen of a mobile gaming device, on the Internet, on the computer monitor of a person sitting at his or her home, in the newspaper, in a newsletter, in a blog, and/or in any other setting. Published statistics may be useful for any person who bets on the values of such statistics. Published statistics may be useful for any entity (e.g., a casino) that takes bets based on the values of such statistics. Such statistics may be used by such people and/or entities, for example, to determine if bet wins and losses.

1.5.4. XML. In various embodiments, statistics may be disseminated in the form of data (e.g., packets transmitted over a computer network).

The data may be tagged so that a recipient of the data may better interpret it. Tags may indicate that data describes one or more of the following: (a) a type of statistic (e.g., the data represents a card count; e.g., the data represents a number of blackjacks that have occurred with the current deck of cards); (b) the time that a game of blackjack was played; (c) the date that a game of blackjack was played; (c) the casino at which a game of blackjack was played; (d) the table at which a game of blackjack was played; (e) the dealer for a game of blackjack; (f) the amount of a bet on a game of blackjack; (g) an identifier for a player in a game of blackjack; (h) a decision made in a game of blackjack (e.g., “hit”; e.g., “stand”); (i) a strategy used in a game of blackjack; (j) a card dealt in a game of blackjack; (k) result of a game of blackjack (e.g., “player won”; e.g., “dealer won”); or any other information. An XML tag may have the appearance of a word in angle brackets, such as “<card count>”. A given tag may have a similarly looking counterpart with the addition of a slash, such as “</card count>. Data falling between these paired tags may warrant the interpretation conveyed by the tags. For example, data falling between <card count> and </card count> may represent a card count. As will be appreciated data may be tagged in many other ways.

2. Modification of the game based on the count. In some embodiments, an aspect of a game may be modified based on the cards that have been dealt from a deck and/or based on the cards that remain in a deck. A particular modification may be based on a statistic about cards that have been dealt from or cards that remain in a deck. For example, a particular modification may be made if the number of aces and ten-value cards remaining in a deck exceed the number of cards ranked two through six by more than 6. In various embodiments an aspect or rule of a game may be fixed or set based on a statistic about cards dealt from or remaining in a deck. Thus, the rule need not change from game to game if the value of the statistic remains constant from game to game, for example.

2.1. Aspects that can be modified. Any aspect(s) of a game may be modified in various embodiments based on statistics. Some examples are given below. It should be understood that other aspects may be modified, and that any combination of aspects may be modified.

2.1.1. Modify the payouts of outcomes. In various embodiments, the payout for an outcome may depend on a statistic about cards dealt from or cards remaining in a deck. For example, depending on the value of a statistic, a blackjack (i.e., an ace and ten-value card) in a game of blackjack may pay either 1:1 or 3:2. As another example, depending on the value of a statistic, an insurance bet may pay either $3 per $1 bet or $8 per $3 bet. As yet another example, a player may be able to bet after a blackjack hand has been dealt (e.g., after one or more cards dealt to the player) and before a dealer's hand has been played. The odds at which the player can bet, may be based on statistics related to the remaining cards in the deck e.g., to provide a desired house edge.

2.1.2. Modify which outcomes are winning outcomes. In various embodiments, whether or not an outcome constitutes a winning outcome may depend on a statistic about cards dealt from or cards remaining in a deck. For example, depending on the value of a statistic, a hand containing five cards may constitute either an automatically winning hand, or an ordinary hand to be judged by its point value. As another example, depending on the value of a statistic, a hand with a point total of 22 may constitute a winning outcome or a losing outcome.

2.1.2.1. Modify which outcomes are pushes. In various embodiments, whether or not an outcome constitutes a push or tie may depend on a statistic about cards dealt from or cards remaining in a deck.

2.1.3. Change the decisions available to players. In various embodiments, the decisions that are made available to a player in a game may depend on a statistic about cards dealt from or cards remaining in a deck. For example, depending on the value of a statistic, a player either may be allowed to surrender or may not be allowed to surrender in a game of blackjack. As another example, depending on the value of a statistic, a player may be allowed to double down, or may not be allowed to double down in a game of blackjack.

2.1.3.1. The player can no longer split. In various embodiments, depending on the value of a statistic, a player may be allowed, or may not be allowed to split in a game of blackjack.

2.1.4. Change the dealer rules. In various embodiments, rules that govern a dealer's actions may depend on a statistic about cards dealt from or cards remaining in a deck. For example, for a first value of a statistic, a dealer will hit on a soft 17 (i.e., a point total of 17 which includes one ace that is counted as 11 points). For a second value of a statistic, the dealer will not hit on a soft 17.

2.1.5. Change game procedures. In various embodiments, game procedures may depend on a statistic about cards dealt from or cards remaining in a deck. For example, if a statistic has a first value, cards that had been removed from a deck may be added back to the deck, and the deck reshuffled. If a statistic has a second value, the deck in its current state may be used for the next game. In some implementations, for example, if a “Hi-Low” count is above a certain value, cards that had been removed from the deck may be added back to the deck, and the deck may be reshuffled, and if the “Hi-Low” count is below the certain value, the deck in its current state may be used for the next game. As another example, if a statistic has a first value, a new player may be allowed to join a game table for the next game. If the statistic has a second value, a new player may not be allowed to join the game.

2.1.6. Modify the probabilities of outcomes. In various embodiments, the probability of an outcome may alter or may be altered based on the value of a statistic. For example, if a statistic has a particular range of values, changes may be made to a future game so that an outcome that would have had one probability may now have a different probability.

2.1.6.1. Shuffle the cards again. In various embodiments, depending on the value of a statistic, cards that had been removed from a deck may or may not be added back to the deck, and the deck reshuffled. Whether or not the cards that had been removed are added back may affect the probabilities of one or more outcomes. For example, if the cards that had been removed included no aces, adding such cards back to the deck will likely lessen the probability of a blackjack being achieved. In various embodiments, if the value of a statistic favors the player, the cards may be reshuffled. For example, if the deck has a relatively high proportion of 10-value cards, then the cards may be reshuffled. In various embodiments, if the value of a statistic favors the casino, the cards may be reshuffled. For example, if the deck has a relatively high proportion of cards with point values of 2 through 6, then the cards may be reshuffled. The deck may be reshuffled when a statistic is favorable to the casino in order to be fair to the player in embodiments where the deck is also shuffled when the statistic is favorable to the player. In various embodiments, the deck is reshuffled whenever the value of a statistic reaches +X or −Y. In various embodiments, the deck is reshuffled whenever the value of a statistic reaches +X or −X. For example, the deck may be reshuffled when the value of a statistic (e.g., a count) reaches either +10 or −10. In various embodiments, when a statistic reaches a particular value and the cards are reshuffled, the cards may be automatically reshuffled. For example, a computer system may track the count via a card reader. When the count has reached a certain point, the computer system may signal that a reshuffle is due. The cards may be automatically swept back into a shuffler (e.g., with a robotic arm). In various embodiments, a human, such as a casino employee, may place all cards back into the shuffler. The shuffler may then be triggered to reshuffle the cards. In various embodiments, Blackjack may be played on a gaming device, on the Internet, or in any other electronic embodiment. A computer processor may track the count of an electronic deck of cards being used in a game of Blackjack. If the count reaches a certain threshold, which may be either positive or negative, in various embodiments, then the cards may be automatically reshuffled.

2.1.6.2. Insert new cards. In various embodiments, depending on the value of a statistic, new cards may be added to a deck. As described above, the addition of new cards to a deck may alter the probabilities of one or more outcomes. For example, adding cards with rank 2 may decrease the probability that the dealer will bust, and thereby decrease the chances that a player will win with a given point total.

2.1.6.3. Revalue the cards in a deck. For example, Jacks only count as 9 now. In various embodiments, depending on the value of a statistic, the point value associated with a card may change. For example, depending on the value of a statistic, a jack may count as either nine points or as 10 points.

2.1.7. Modify allowed bets. In various embodiments, depending on the value of a statistic, a restriction may be put on the bets that are allowed in a game. A restriction may limit a player to betting only up to a certain absolute amount, such as up to $100. A restriction may also set a minimum amount of a bet. A restriction may limit a player to betting only up to a certain amount in relation to his prior bet. For example, a player may be restricted to betting only up to 150% of the amount of his prior bet (e.g., the bet the player made on the preceding game or proceeding betting round). In some embodiments, a player may be restricted to betting more than a certain amount in relation to his prior bet. For example, a player must bet at least 80% of the amount of his prior bet. A restriction may set a maximum or minimum number of hands that a player may play during a game. For example, a player may be restricted to playing no more than 1 hand during a game, or to playing a minimum of 2 hands during a game.

2.1.7.1. Bets must be small when the count favors the player. In some embodiments, if a statistic indicates that a player has an advantage, an upper limit may be placed on the allowable bets by the player. For example, if a statistic implies that a player can expect to make more than 100% of his bet, on average, with proper play, then the player may be restricted to betting only up to the amount of his prior bet.

2.2. Let the player know about the modification. In various embodiments, a player may or may not be informed of a modification made to a game. In particular a player may be informed of a modification made to a game in response to the occurrence of a particular value of a statistic. A player may be informed via a display device, such as a display screen built into a game table. A player may be informed orally, such as by a dealer of a game. A player may be informed through the actions of another, such as through the actions of a casino employee. For example, if the player views the dealer adding cards to a deck, the player may become aware that a modification has been made to the game. In some embodiments, a player may be informed via a player device. For example, a player may be playing a game at a gaming device. The gaming device may display a text message, graphical indicator, or any other indication to the player informing the player that a modification has been made to a game. In some embodiments, rules for making modifications may be posted or otherwise made available for a player's perusal. The rules may detail what modifications will be made in response to different values of a statistic. In turn, the value of the statistic may be displayed to the player. Thus, a modification to a game may be implied in light of the value of the statistic and the rules detailing what modifications would be made in response to the value of the statistic. In some embodiments, a player may be informed of a modification via a mobile device of the player. For example, a player may receive a message on a cell phone, personal digital assistant, Blackberry®, laptop, mobile gaming device, and so on, informing the player that a modification of a game has been made. In some embodiments, the player may be involved in the game on the mobile device. A mobile device used or possessed by a player may include a mobile device according to Nevada bill AB 471. In some embodiments, the player may not be explicitly informed of a modification. Rather, the player may be informed of the current rules for a game. Modifications to the rules may then become apparent to the player as he notices that different rules apply from time to time.

2.3. Maintain the same house advantage. In various embodiments, modifications are made to rules or aspects of a game so as to maintain a constant or nearly constant (e.g., within a same magnitude of percentages, less than 10% variation, less than 50% variation, less than some other desired variation, or any other desired level of consistency) house advantage over a range of values of a statistic. For example, the casino may wish to maintain a house advantage of 1% in a game, regardless of the value of a statistic. Thus, as the statistic changes and influences the house advantage in one direction, changes to the rules of the game may be made to influence the house advantage in the opposite direction. For example, suppose a statistic is such that a house advantage has been reduced to −1%. The rules of the game may be modified to bring the house advantage back up to a desired 1% again. In some implementations, the rules may be modified so that the house always has at least some advantage. In some embodiments, a casino may wish to have a certain minimum house advantage but may have no restrictions on how large a house advantage can go. Thus, for example, rules of a game may be modified if the house advantage gets below a certain level but may not be altered if the house advantage grows in the casino's favor.

2.4. Player can avoid any game modification by committing to a strategy in advance. In various embodiments, a player may avoid the possibility of a change in the rules of a game by committing to a strategy in advance. By committing to a strategy in advance, the player gives up the ability to alter his strategy in response to the value of a statistic. The player, as a consequence, may give up his ability to profit, on average, from fluctuations the value of a statistic.

2.4.1. The player commits to a betting strategy. In some embodiments, a player may commit to a particular betting strategy. For example, a player may commit to betting $10 per hand for the next 5 hands, followed by $15 per hand until a deck is reshuffled. The player may thereby give up the possibility of altering his bet size by, for example, increasing his bets if a statistic indicates that the player has an edge over the casino. In other embodiments, a player may commit to betting with a particular range, betting a particular amount under certain circumstances, and/or accepting any other strategy.

2.4.2. The player commits to a playing strategy. In some embodiments, a player commits to a particular playing strategy in advance. For example, a player may commit to using basic strategy on all hands, even if deviations from basic strategy would be warranted by the value of a statistic.

2.4.3. Player commits to playing a certain number of hands. In some embodiments, a player commits to playing a certain number of hands per game. In this way, for example, a player will not be able to increase the number of hands played per game if the value of a statistic indicates an advantage for a player and/or decrease the number of hands played if the statistic indicates a disadvantage for a player.

3. What triggers a modification and why? In some embodiments, a modification to the rules of a game may be triggered when a statistic reaches a certain value of a predefined set of values. For example, suppose a statistic describes the number of aces and ten-value cards that are unknown less the number of cards ranked 2-6 that are unknown. If the statistic reaches a value of 5 or greater, a rule may be put in place (i.e., triggered) so that a player can no longer surrender in a game. In some embodiments, a casino may maintain a table which indicates, for each value or set of values of a statistic, a corresponding rule that should be in place. In some embodiments, a modification to the rules of a game may be triggered based on the values of a plurality of statistics. For example, of statistic X is greater than 3 or statistic Y is less than 9, a particular rule may be put in place.

3.1. Statistic leads to player advantage. In some embodiments, a modification may be made to the rules of game if the value of a statistic indicates an increased player advantage in the game and/or a decreased casino advantage in the game. A rule modification may then occur so as to offset the increased player advantage and/or decreased casino advantage.

4. Disclosure of the rules of the game. The rules could be very complicated, for example, odds will be maintained consistently. In various embodiments, the criteria or triggers that a casino uses for modifying the rules of a game may be communicated to one or more parties, such as to players, to game operators, and/or to regulators. In some embodiments, the modifications that will be made to the rules under various triggering conditions may also be communicated.

4.1. Communication of the rules themselves. A communication of criteria or triggers for changing rules in a game may include a list of every possible value of a statistic and/or a corresponding set of rules that will be in effect given the value of the statistic. In various embodiments, a communication may specify a standard or default set of game rules. The communication may then indicate possible rule modifications and the values of the statistics that would lead to the rule modifications. A communication of criteria, triggers, and/or rule modifications may take the form of a printed document, and electronic display, document, packet and/or other transmission. In some embodiments, the communication may be transmitted via phone, fax, email, a computer network, and/or postal mail.

4.2. Communication of the rationale and/or the effects of the rules. In various embodiments, a casino may specify the rationale for varying the rules of a game based on the value of a statistic. For example, a casino may state that varying the rules in response to the value of a statistic may allow the casino to maintain a house edge within a fixed range, regardless of the value of the statistic. In various embodiments, a casino may communicate the effects or consequences of a rule change. When a casino communicates the effects or consequences of a rule change, the casino may communicate: (a) a probability of an outcome; (b) a payout for an outcome; (c) an allowed or disallowed player decision (e.g., splitting aces is no longer allowed); (d) a maximum bet; (e) a minimum bet; (f) a house edge; (g) an edge for the player; (h) a probability that a player wins; (i) a probability that a player ties; (j) a probability that a player loses; and/or and other desired information.

4.3. Disclosure to regulators. In various embodiments, a casino may disclose to regulators the rationale for and/or the effects of varying the rules of a game based on the value of a statistic. In some embodiments, a casino may report to regulators each time the rules of a game are changed. Thus, in some embodiments, a casino may report to the regulators prior to each new game what the applicable rules of the game are (e.g., a complete set of rules, a set of modifications from a prior game, etc.). In some embodiments, the casino may report to the regulator the value of a statistic. The regulators may then be able to deduce the rules of the game at the casino based on a schedule previously provided by the casino detailing which rules will apply given each possible value of the statistic.

4.4. Disclosure to players. In various embodiments, a casino may communicate to players the triggers or criteria for changing the rules of a game in response to the value of a statistic. In various embodiments, the casino may present to players a set of new rules every time the rules of the game change. In some embodiments, the casino may present to a player a set of possible values of a statistic coupled with corresponding rules that will be in effect given the statistics.

5. Tracking the count. In some embodiments, a house or casino may keep track of statistics in a game. The casino may use the tracked value of the statistics to determine whether or not it should modify the rules of a game. In some embodiments, the rank and/or suit of a card is determined. The card may be a card that has been dealt in a game or a card that remains in a deck. The rank and/or suit may then be used in determining the value of a statistic. For example, a statistic may start with value 0. For every card with a rank of 10 through Ace, the value of the statistic may be decreased by 1. For every card with a rank of 2 through 6, the value of statistic may increase by 1. Thus, a casino may store and use algorithms for converting information about cards into a value of a statistic. In various embodiments, the statistic may serve as a way to summarize information about a large number of cards.

5.1. Card shuffler. In some embodiments, a card shuffler and/or a card dealer may track the cards that are dealt in a game. For example, a card shuffler may include an optical reader, bar code scanner, detector for invisible ink on a card, or any other means for determining information about a card. Such information may include a rank and or suit.

5.2. Cameras. In some embodiments, a camera may track the cards that have been dealt in a game. Graphics processing algorithms may be used to determine the ranks and/or suits of the cards dealt in the game. Cameras used may include casino security cameras. Cameras used may include cameras that are attached or associated with game tables.

5.3. Manual (by dealer). In some embodiments, a casino employee, such as a dealer, may keep track of the value of a statistic by, for example, watching the cards that have been dealt in a game. The casino representative may enter information about the cards dealt into a computer or other device. The computer may thereby convert information about cards dealt into the value of a statistic. In some embodiments, the casino representative may himself determine and keep track of the value of a statistic.

5.4. Electronic games. In some embodiments, a player may participate in a game using an electronic device. For example, the player may play blackjack at a video blackjack machine. The player may also play a game over the Internet. In some embodiments, the algorithms that are used to conduct a game may also keep track of one or more statistics associated with the game. For example, as the algorithm deals a card to a player in the game, the algorithm may increment or decrement the value of the statistic based on the card dealt. In some embodiments, the algorithm may have advanced access to the entire composition of the deck before the game has even started. Thus, the algorithm may be able to determine in advance what the value of a statistic will be based on the number of cards that will have been dealt at that point.

6. Game state as input to a game. In some embodiments, a statistic may serve as an explicit part of a game. For example, if the rank of a card matches the value of a statistic, then the card may be wild. As another example, a player may be able to add the value of his statistic to the point total of his hand in order to derive a new point total. In various embodiments, the way in which a statistic serves as part of a game may offset any change in the house advantage that would otherwise be indicated by the statistic. For example, if a value of a statistic would ordinarily be associated with a diminished house advantage in a game, the fact that the statistic is explicitly incorporated into the game in a particular manner may serve to increase the house advantage. For example, a statistic may represent the number of unknown cards with ranks of 10 through ace less the number of unknown cards with ranks of 2 through 6. In many versions of blackjack, such a statistic is known to be associated with an increasing player advantage as the statistic increases, and an increasing house advantage as the statistic decreases. In various embodiments, the value of the statistic may count as a third card in the player's initial hand. The statistic may thereby add to the point value of the initial two cards dealt to the player. In such embodiments, when the value of the statistic is positive, the statistic will tend to work against the player, making it more likely that a player will bust even when without drawing any new cards. For example, a positive value of 2 of the statistic would mean that a common initial hand with two ten-value cards dealt would in fact yield a point total of 22, causing the player to bust.

However, in such embodiments, when the value of the statistic is negative, the statistic may tend to work in the player's favor by giving the player more flexibility in hitting, standing, or doubling down, since he will tend to have further to go before busting. Thus, by explicit incorporation of the statistic into the game, a player advantage associated with a large positive value of the statistic may be offset, while a house advantage associated with a large negative value of the statistic may also be offset. In some embodiments, a game from which the statistic is derived and a separate game involving the statistic may both be played. Another example of a game/modification based on the statistic includes a rule that if a "Hi-Low" count remains negative for a certain number of hands, the player receives a bonus (e.g., a payout, a positive change to the rules, etc.). In some embodiments, the player may be required to bet extra for such a game. Such additional games/modification may be arranged such that even while the normal game odds are against the player, the other odds overall tend to be not as against the player thereby encouraging the player to continue playing.

7. The game is intentionally started at a certain count. In various embodiments, a starting state of a game may be altered in order to affect the value of a statistic. The value of the statistic may be influenced, for example, in such a way as to work to the house's advantage. For example, when a deck has just been shuffled, five ten-point value cards may be removed from the deck. This removal may alter the value of a statistic in a casino's favor and make it unlikely that the statistic will ever shift in the player's favor. A player may be allowed to choose such an altered state and in return may receive other advantages, game options, rule modifications, etc.

8. Presentation of information. Information about a game may be presented to users of a gaming device, players at a gaming table, etc. through, for example, a graphical display and/or through an audio presentation. For example, at a gaming device, images of cards may be shown to indicate the current state of the game, and the images may change and/or be added to as the game is played. Animation may be shown for the shuffling of cards, the dealing of cards, and/or any other action.
   8.1. Vocal information. Information may be presented in an audio format. For example, in some embodiments, a voice may indicate the cards that are dealt, statistics about a game, actions that are being taken or are available to be taken, etc. In some implementations, a player may have a choice of voices to be used. Voice may include, for example, celebrity voices, voices recorded or input by players, and/or any other voices.
   8.2. Customizable Display. In some embodiments, a display of information may be customizable according to a player's preferences. For example, a player may be able to choose a desired back design of cards, a desired texture for a table, a desired table layout, and/or any other desired elements of a game design.
8.3. Display information about historic/statistical information. In some embodiments, information may be displayed about statistics, strategy suggestions, historic data, etc. For example, in some implementations, a player may be shown an indication of recent cards dealt (e.g., cards dealt since the last shuffle of a deck). As another example, a player may be shown an indication of a number of ten-valued cards remaining in a deck. Such information may be shown after a player performs an action associated with requesting the information (e.g., verbally, by operating a control, by moving a pointer over an area, etc.).
9. User configurable strategy. In some embodiments, a player may choose/develop a strategy. The strategy may be used to perform automatic actions for the player and/or provide suggestions of actions that are in accordance with the strategy to the player. For example, a strategy may include always passing on an insurance bet, always doubling down on a hand value of 11, and/or any other automatic actions. When a situation arise that is covered by a strategy, a player response to the situation may take place without input from the player in some embodiments.
   9.1. Bet Patterns. In some embodiments, a betting strategy may be developed based on a pattern of bets of a player. For example, if a player repeatedly performs an action (e.g., a double down on a hand value of 11), a strategy reflecting that pattern may be developed (e.g., recognized by a gaming device, recognized by a dealer, etc.). The player may be offered an option of automating play in accordance with that pattern. As another example, patterns may include game play that is based on statistics, such as a strategy of playing basic strategy with betting adjusted according to a "Hi-Low" card count.
   9.2. Allow Autoplay. Some embodiments may allow a game to be automatically played in accordance with a desired strategy. For example, a player may select that a game be played in accordance with basic strategy for a number of hands. A dealer, gaming device, or so on may then play a game and provide for the player to play in accordance with the selected strategy without additional intervention. A player may select a number of hands to be played in such fashion. The strategy selected may be from a set of pre-arranged strategies, an optimal strategy, a player designed strategy, and/or any other desired strategy.
10. Allow players to peek at one or more cards in the deck. Some embodiments may allow a player to see the value of one or more cards that remain in the deck before deciding on an action (e.g., bet, hit, stand, etc.). For example, a player may choose to peek at the second card from the top of the deck. In some embodiments, the player may choose to look at any one of a set of available cards (e.g., any card after the tenth from the top). A player may be required to pay a fee and/or accept an adjustment to a game for the privilege of peeking at the card or cards. In some embodiment, the card seen may stay in the deck after being seen. In other embodiments, the card seen may be taken out of play after being seen.
11. Allow players to replay a hand. In some embodiments, a player may be given an option to replay a particular hand that they lost and/or won. For example, the initial cards dealt may be kept for an additional hand after an initial hand is finished. Some or all of the extra cards dealt during the initial hand may be removed (e.g., discarded). The player may then play the base cards, and in some implementations some extra cards, with the remaining cards of the deck. A player may be charged a fee and/or a game may be modified (e.g., to increase a house edge as a fee for replaying the hand) if a player selects to replay a hand.
12. Show play of a hand according to a strategy. In some embodiments, a player may be shown a hand played according to a strategy. The player may be shown the play of the hand apart from any hand actually played by the player in some implementations. In other implementations, the player may be shown the play of a hand dealt to the player before the player plays that hand, after the player plays that hand, and/or during play of that hand by the player. The cards used to show the play of the hand may be cards from the deck used by the player and/or cards from another deck. The cards may be the same cards as will be used to play the same hand by the player in the future, the same cards that were used to play the same hand by the player in the past, and/or different cards. The strategy may be any desired strategy (e.g., selected by the player, dealer, operator, etc.). The strategy may include basic strategy, an optimal strategy, a player defined strategy, etc. An optimal strategy may include an optimal strategy with or without knowledge of the cards that will be dealt in the hand.
13. Allow multiple hands. Some embodiments may allow a player to play multiple hands. In some implementations, the player may bet on a plurality of hands. In some implementations, the player may play one or more dummy hands in addition to or as an alternative to betting on one or more hands. The play of a dummy hand may proceed similarly to the play of a hand on which a bet is made. In some embodiments, the play of multiple real and/or dummy hands may be automated according to any desired strategy.
   13.1. Players get to see more cards from the deck. If dummy hands and real hands are played from the same deck, the ability to play dummy hands in some embodiments may allow a player to see more cards from the deck. Information about the cards played in the dummy hands may be used by a player to adjust play of a real hand. Accordingly, since this information may give a player an advantage, the player may be required to pay a fee to play dummy hands, to pay a fee for cards dealt to a dummy hand, and/or accept a rule modification negating that advantage. In other embodiments, the dummy hands may be played from a different deck than the real hands.

14. Intermediate play betting options. In some embodiments of any card game, including, blackjack, punto banco, baccarat, and any other desired game, a player may be presented with betting options on intermediate events. For example, a player may be presented with an option to bet on the value of a dealer's face down card or cards, the total value of dealer's hand, and/or any other information about a game. A player may be presented with any number of in-run betting options in games that do not traditionally support in-run betting. For example, in a blackjack game, a player may be allowed to place a bet on a hand after the cards have been dealt, after a player and/or the dealer has hit any number of times, etc. In some implementations, the odds of the bet may be adjusted to take into account the probabilities based on the dealt cards. For example, odds of in-run bets may be calculated to maintain at least a minimum house edge for in-run bets. Some embodiments may allow players to make in-run bets on other player's hands or games. For example, a player at a first gaming machine or first position at a table may place an in-run bet on a hand of a player at a second gaming machine or second position at a table. In some implementations, a mobile gaming device may be configured to allow players to make such in-run bets of games being played by other players (e.g., at nearby tables, at nearby machines, etc.).

15. Show player indications of play according to a strategy. In some embodiments, a player may be shown information about play of a game according to a strategy. The strategy may include, for example, an optimal strategy, a basic strategy, a user defined strategy, a strategy used by other players, and/or any other desired strategy. For example, in some embodiments, an action that would be taken according to a strategy may be highlighted or otherwise indicated to a player. Some implementations may provide an explanation of why a particular action is in accordance with the strategy (e.g., a written description, a vocal explanation, an outcome chart, etc.). A user may request such an explanation, for example, by clicking on a "why" button in some implementations.

16. Show information about the actions taken by a plurality of players. In some embodiments, a player may be shown statistics or other indications that relate to the actions taken by a plurality of players in a similar or same situation. The actions may not be optimal actions or actions in accordance with any comprehensive strategy. For example, in some implementations, a player may be shown the percentage of times other players have taken each available action and/or the percentage of times that action resulted in a winning hand. The determination of a similar situation may be made based on similarities or sameness of the cards in a player's hand, the cards shown in a dealer's hand, and/or cards that have been dealt from a deck (i.e., burned).

16.1. Filtering the player-base. In some embodiments, the player-base from which the statistics are taken may be limited to a particular set of players. For example, in some embodiments, a user, dealer, operator, etc. may establish a social network, demographic information, list of friends, list of expert players, list of desired players, etc. The list and/or information may be used as a filter for the statistical information. For example, the statistical information may only reflect actions taken by players that are in the list and/or that match certain characteristics of demographic information. So, as an example, a player may be shown the statistics of actions taken by his friends when they were in a similar gaming situation.

16.2. Show information after a request action. The information may be provided after a player requests the information by performing some action indicative of a request. For example, a movement of a mouse to a particular location (e.g., over a button for an action) may cause a display of statistical information to be displayed. In some implementations, a user may be charged for the display of such information and/or accept a change to the rules of the underlying game.

17. Record and/or display historic information. Some embodiments may track player actions over time. Multiple players over many games may be tracked. Such tracking may include tracking players in disparate locations playing over different media. The tracking may be used to provide statistical information and/or historical data. The tracking may include monitoring game play and recording information about the game play. Such information may be stored in a computer database, a paper book, and/or any other desired location. The information may include any details about a game, such as the cards played, the outcome of the games, the players of the game, the location of the game, the time of the game, and so on. The information may be stored as a comprehensive record of game play separately recording each game, a condensed record of statistical information obtained from that game play and/or any other form.

17.1. Allow player to view historic information. In some embodiments, players may be shown information about historic game play. The information may compare a player's game play to the historic data. For example, a player may be shown a histogram of information that may include a frequency of particular cards dealt, a frequency of hand values dealt, a frequency of player actions in particular circumstances, how actual outcome relate to expected outcomes, a frequency of blackjacks dealt, hands a player won against a dealer for a period of time (e.g., ever, during a gaming session, etc.), a number or percentage of blackjacks dealt to a player and/or dealer, a frequency or number of dealer busts based on initial dealt cards, a frequency or number of player busts for initial dealt cards, a rating of a player against expected results from a strategy (e.g., optimal play, basic strategy, other strategy), a comparison of a player's play to one or more other players' play, a rating of game play, a win-loss ratio, a number of wins, a number of losses, and/or any other desired information. The historic information may include casino-wide, state-wide, country-wide, and/or world-wide statistics about all players, all dealers, etc. In some embodiments, the historic information may be filtered based on a list of players, demographic information about players, etc.

18. Reshuffle deck based on a cut card. In some embodiments, a plurality of hands may be played from a deck without shuffling the deck. A special card indicating that the deck should be shuffled may be inserted into the deck. When the card is reached in the deck, the deck may be shuffled. In an electronic game, the card may be a virtual card that does not appear to a player of the game. Shuffling the deck may be performed after a hand during which the shuffle card was drawn is completed, and/or after the shuffle card is drawn regardless of whether a hand is in progress. If a hand is in progress and the deck is to be shuffled, the cards in play may be left out of the shuffle, but previously burned cards may be included in the shuffle.
    18.1. Limit the location of the shuffle card. The shuffle card may be limited in its location to within a certain range. For example, a card may be no less than a desired number of cards from the top of the deck and/or no more than a desired number of cards from the top of the deck. The card may be inserted randomly within the deck at any location in the range.
    18.2. Shuffle implemented without a card. It should be recognized that in various embodiments, the concept of a random shuffle could be implemented in any way with or without the use of an actual or virtual shuffle card. For example, a random number of cards may be selected, and after that number of cards is dealt, a shuffle may be performed, each time a card is dealt, a random value may be select that indicates whether a shuffle should or should not occur, and/or any other method of providing an element of randomness into the occurrence of a shuffle may be used.

What follows is a list of embodiments, not claims. Claims follow on a separate physical sheet.

A. A method comprising:

determining a first value of a statistic describing a deck of cards;

determining at least one card used from the deck of cards in a game of Blackjack;

determining a second value of the statistic based on the first value and based on the at least one card;

determining whether the second value is either greater than a first threshold or less than a second threshold; and shuffling the deck of card prior to using the deck for any further games of blackjack if the second value is either greater than the first threshold or less than the second threshold.

B. The method of embodiment A in which the statistic is a card count.

C. The method of embodiment A in which the statistic represents the difference between the number of ten-value cards remaining in the deck and the number of cards remaining in the deck with point values of two through six.

D. The method of embodiment A in which determining the second value of the statistic includes incrementing the first value if the at least one card has a point value of two through six and decrementing the first value if the at least one card has a point value of 10.

E. The method of embodiment A in which the first threshold is nine and in which the second threshold is negative eight.

F. The method of embodiment A in which the first threshold is nine and in which the second threshold is negative nine.

G. The method of embodiment A in which determining at least one card occurs after the first value has been determined and in which determining a second value occurs after the at least one card has been determined.

H. A method comprising:

determining a first value of a first statistic describing a first game of Blackjack;

determining a second value of a second statistic describing a second game of Blackjack; and displaying the first value and the second value together.

I. The method of embodiment H in which displaying includes displaying the first value and the second value on a public monitor.

J. The method of embodiment H in which displaying includes displaying the first value and the second value on the screen of a mobile gaming device.

K. A method comprising:

determining a first value of a first statistic describing a first game of Blackjack;

determining a second value of a second statistic describing a second game of Blackjack;

determining a third value of a third statistic based on the first value and the second value; and displaying the third value.

L. The method of embodiment K in which the third statistic represents an average of the first statistic and the second statistic.

M. The method of embodiment K in which the first and second statistics represent card counts at the respective first and second games of Blackjack.

N. A method of playing a card game, the method comprising:

determining a first value of a statistic describing a deck of cards;

determining a comparison between the first value and a threshold value; and adjusting a rule of the card game based on the comparison.

O. The method of N in which the statistic represents the difference between the number of ten-value cards remaining in the deck and the number of cards remaining in the deck with point values of two through six.

P. The method of claim N in which the statistic represents a house edge associated with play of the card game.

Q. The method of claim N in which adjusting the rule includes adjusting the rule to maintain a house edge associated with play of the card game.

R. The method of claim N in which the rule includes at least one of a rule controlling payouts for winning the game, a rule controlling which outcomes are winning outcomes, a rule controlling which outcomes are tie outcomes, a rule controlling the decisions available to a player, a rule controlling the actions of a dealer, a rule controlling the procedures of a game, a rule controlling the value of cards in the card game, and a rule controlling allowed bets.

S. The method of claim R in which the card game includes a blackjack game.

T. The method of claim N, in which the rule includes a rule allowing at least one of discarded cards to be added to the deck and additional cards to be added to the deck.

U. A method of playing a card game, the method comprising:

storing information about actions taken by a plurality of players during play of a plurality of hands of the card game;

providing an indication of a current state of a hand of the card game; and providing an indication of a statistic related to at least some of the actions taken by the plurality of players.

V. The method of claim U in which the statistic includes an indication of a percentage of times the plurality of players took a particular action when in a state similar to the current state.

W. The method of claim V in which the statistic includes on indication of a percentage of times the particular action resulted in a winning hand.

X. The method of claim U in which the statistic is based on a subset of the plurality of players that at least one of have a desired demographic characteristic and are within a desired group of people.

Y. The method of claim U in which the card game includes blackjack.

Z. A method of playing a card game, the method comprising:

dealing a plurality of hands of the card game from a same-ordered deck of cards;

determining when to shuffle the deck of cards based on a number of cards dealt when dealing the plurality of hands of the card game; and shuffling the deck in accordance with the determination to reorder the deck of cards.

AA. The method of claim Z, in which determining when to shuffle the deck of cards includes determining if a card indicating that the deck should be shuffled was drawn.

AB. The method of claim AA, in which the card indicating that the deck should be shuffled is a virtual card.

AC. The method of claim AA further comprising, inserting the card indicating that the deck should be shuffled into the deck at an at least partially random location.

AD. The method of claim Z, in which determining when to shuffle the deck of cards includes determining if a threshold number of cards have been dealt.

AE. The method of claim AD, further comprising at least partially randomly determining the threshold number.

AF. The method of claim Z, in which the card game includes blackjack.

AG. A method of playing a card game, the method comprising:

providing an indication of a current state of a hand of the card game;

receiving a request to view a card that is not yet dealt from a deck of the card game; and providing an indication of the value of the card without dealing the card.

AH. The method of claim AG, in which the card is not the top card of the deck.

AI. The method of claim AG, further comprising dealing the card after receiving an additional request to deal the card.

AJ. The method of claim AG, in which the card game includes blackjack.

AK. The method of claim AG, further comprising removing the card from play.

The invention claimed is:

1. An apparatus comprising:

a computing device configured to be coupled to a card table, in which the computing device includes a processor and a non-transitory medium having stored thereon a plurality of instructions that are executable by the processor; and an optical sensor configured to be coupled to a card shoe and configured to hold a plurality of playing cards, in which the optical sensor is configured to generate an image of cards of the plurality of playing cards as the cards are drawn from the card shoe and communicate identifying information to the computing device;

in which the computing device is configured to:

determine a number of players in a card game at the card table;

control a display of a mobile computing device of at least one player of the card game at the card table to present rules of the card game and an option to wager on an intermediate event in the card game after a card has been drawn from the card shoe and while the card game is being played;

receive from the sensor an indication that a card has been drawn from the card shoe, the indication including an identity of the drawn card;

receive, from the at least one player, a request for a statistic describing the card game played at the card table;

determine an updated value of the statistic based at least in part on the identity of the drawn card;

adjust the rules of the card game by an adjustment when the updated value of the statistic is at least one of greater than a first threshold value and less than a second threshold value; and control the display to present the rules of the card game, as adjusted, and an outcome of a wager on the intermediate event.

2. The apparatus of claim 1, in which the statistic represents an advantage for a house in the card game.

3. The apparatus of claim 1, in which the adjustment includes an adjustment that maintains a house edge associated with play of the card game.

4. The apparatus of claim 1, in which the rules include at least one of a rule controlling payouts for winning, a rule controlling which outcomes are winning outcomes, a rule controlling which outcomes are tie outcomes, a rule controlling decisions available to a player, a rule controlling actions of a dealer, a rule controlling procedures of at least one given card game, a rule controlling value of cards, or a rule controlling allowed bets.

5. The apparatus of claim 1, in which the rules include a rule allowing at least one of discarded cards to be added to the playing cards and additional cards to be added to the playing cards.

6. The apparatus of claim 1, in which the computing device is configured to transmit an indication that a rule adjustment is due.

7. The apparatus of claim 1, in which the computing device is configured to at least partially randomly determine the first threshold value.

8. The apparatus of claim 1, in which the rules include a rule governing surrender in the card game.

9. The apparatus of claim 1, in which the adjustment is based, at least in part, on at least one statistic other than the statistic.

10. The apparatus of claim 1, in which the adjustment includes an adjustment configured to offset at least one of an increase and a decrease in an advantage of a house in the card game.

11. The apparatus of claim 1, in which the adjustment includes a change to a probability of an outcome in the card game.

12. The apparatus of claim 1, in which the statistic includes a card count.

13. The apparatus of claim 1, in which the adjustment includes at least one of (i) an addition of at least one card to the plurality of playing cards, (ii) revaluing at least one card of the plurality of playing cards, (iii) a change to an allowed bet amount; or (iv) an adjustment to maintain at least a minimum house edge in the card game.

14. The apparatus of claim 1, in which the computing device is configured to determine that a house edge is below a desired value based on the updated value of the statistic and in which the adjustment includes an adjustment that increases the house edge above the desired value.

15. The apparatus of claim 1, in which the cards include a card that is used to play the card game.

16. The apparatus of claim 1, in which the statistic represents an advantage for a house in the card game and a card count.

17. The apparatus of claim 1, in which the statistic represents an advantage for a house in the card game and a percentage.

18. The apparatus of claim 1, in which the adjustment includes an adjustment allowing at least one of discarded cards to be added to the playing cards and additional cards to be added to the playing cards.

19. The apparatus of claim 1, in which the adjustment includes an adjustment allowing at least one of discarded cards to be added to the playing cards and additional cards to be added to the playing cards and in which the adjustment includes at least one of an adjustment controlling payouts for winning, an adjustment controlling which outcomes are winning outcomes, an adjustment controlling which outcomes are tie outcomes, an adjustment controlling decisions available to a player, an adjustment controlling actions of a dealer, an adjustment controlling procedures of the card game, an adjustment controlling value of cards, or an adjustment controlling allowed bets.

20. The apparatus of claim 1, in which the adjustment includes an adjustment allowing at least one of discarded cards to be added to the playing cards and additional cards to be added to the playing cards and changing a probability of an outcome in the card game.

* * * * *